US008973730B2

(12) United States Patent
Nireki

(10) Patent No.: US 8,973,730 B2
(45) Date of Patent: Mar. 10, 2015

(54) BANK NOTES HANDLING APPARATUS

(75) Inventor: Takao Nireki, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 604 days.

(21) Appl. No.: 13/055,068

(22) PCT Filed: Jul. 21, 2009

(86) PCT No.: PCT/JP2009/063070
§ 371 (c)(1), (2), (4) Date: Jan. 20, 2011

(87) PCT Pub. No.: WO2010/010875
PCT Pub. Date: Jan. 28, 2010

(65) Prior Publication Data

US 2011/0128526 A1 Jun. 2, 2011

(30) Foreign Application Priority Data

Jul. 22, 2008 (JP) ................................ 2008-188363

(51) Int. Cl.
*G07F 7/04* (2006.01)
*G06K 7/00* (2006.01)
*G06K 9/00* (2006.01)
*G07D 7/00* (2006.01)
*G07D 7/12* (2006.01)

(52) U.S. Cl.
CPC ........................................ *G07D 7/12* (2013.01)
USPC . 194/207; 382/135; 271/265.01; 271/265.04; 271/262; 271/263

(58) Field of Classification Search
USPC ................... 194/206, 207; 209/534; 382/135; 271/262, 263, 265.01–265.04; 235/379
See application file for complete search history.

(56) References Cited

U.S. PATENT DOCUMENTS 5,304,813 A * 4/1994 De Man ........................ 250/556
5,498,879 A * 3/1996 De Man ........................ 250/556
5,687,963 A * 11/1997 Mennie ......................... 271/119

(Continued)

FOREIGN PATENT DOCUMENTS

JP 2001 56876 2/2001
JP 2001 357429 12/2001

(Continued)

OTHER PUBLICATIONS

International Search Report issued Oct. 27, 2009 in PCT/JP09/063070 filed Jul. 21, 2009.

*Primary Examiner* — Jeffrey Shapiro
(74) *Attorney, Agent, or Firm* — Lexyoume IP Meister, PLLC

(57) ABSTRACT

A paper sheet processing apparatus includes: an insertion slot through which a paper sheet is inserted; a sensor which detects insertion of the paper sheet; a traveling route through which the paper sheet is conveyed; a light emitting part which irradiates the traveling route with light; a light receiving part which receives light from the traveling route; a black calibration part which sets a reference value for the lowest brightness in a state that the emission of the light emitting part is ineffective; and an authenticity judgment processing part which judges an authenticity. The black calibration part can set the reference value before the authenticity judgment processing part judges the authenticity after the sensor detects the insertion of the paper sheet at every time when the paper sheet is inserted.

10 Claims, 14 Drawing Sheets

(56) References Cited

U.S. PATENT DOCUMENTS

| | | | | |
|---|---|---|---|---|
| 5,912,988 | A * | 6/1999 | Moore | 382/209 |
| 5,947,255 | A * | 9/1999 | Shimada et al. | 194/207 |
| 6,256,407 | B1 * | 7/2001 | Mennie et al. | 382/135 |
| 2001/0035603 | A1 * | 11/2001 | Graves et al. | 271/265.01 |
| 2003/0057053 | A1 | 3/2003 | Kano et al. | |
| 2003/0210386 | A1 * | 11/2003 | Laskowski | 356/71 |
| 2004/0223147 | A1 * | 11/2004 | Fujimoto et al. | 356/239.1 |
| 2005/0233339 | A1 * | 10/2005 | Barrett et al. | 435/6 |
| 2007/0278065 | A1 * | 12/2007 | Voser | 194/317 |
| 2008/0240512 | A1 | 10/2008 | Nireki | |
| 2009/0022390 | A1 * | 1/2009 | Yacoubian et al. | 382/135 |
| 2009/0057095 | A1 * | 3/2009 | Chien | 194/302 |
| 2010/0282566 | A1 * | 11/2010 | Zoladz et al. | 194/302 |
| 2011/0121950 | A1 * | 5/2011 | Izadi et al. | 340/10.5 |

FOREIGN PATENT DOCUMENTS

| | | |
|---|---|---|
| JP | 2003 67805 | 3/2003 |
| JP | 2008 84278 | 4/2008 |

* cited by examiner

BANK NOTES HANDLING APPARATUS

FIELD OF THE INVENTION

The present invention relates to a paper sheet identification apparatus (or bank notes handling apparatus) which identifies the authenticity of a bill, a gift certificate, a coupon ticket, and so on (hereafter, these are collectively referred to as a paper sheet).

BACKGROUND ART

In general, a bill processing apparatus, which handles a bill as one of the embodiments of the paper sheet, is incorporated into a service device such as a game medium rental machine installed in a game hall, a vending machine or a ticket-vending machine installed in a public space, or the like which identifies the authenticity of the bill inserted from a bill insertion slot by a user and provides various types of products and services in accordance with a value of the bill having been judged as authentic.

The above-mentioned authenticity of the bill is judged, for example, by an authenticity judging device comprising a light emitting part irradiating the bill moving in a bill traveling route with light and a light receiving sensor receiving transmitted light and reflected light of the light irradiated by the light emitting part, and an authenticity judgment process is conducted by comparing received light data transmitted from the light receiving sensor with legitimate data as disclosed in Patent Reference 1.

Meanwhile, it is known that the above-mentioned light receiving sensor of the authenticity judging device has a device property to deteriorate with the lapse of time. As such deterioration is caused with the lapse of time, an output value is lowered such that received light data of the bill may represent dim light. Therefore, so-called black calibration (black balance) to correct a reference value of the output for the lowest brightness is performed every predetermined period of time. For example, it is typically performed that an output from the light receiving sensor is read in a state where no light is irradiated from the light receiving part when the bill processing apparatus is turned on and the received light data having been read in this way is set as the reference value for the lowest brightness.

[Patent Reference 1] Japanese unexamined patent application publication No. 2001-279487

DISCLOSURE OF THE INVENTION

Problem to be Solved by the Invention

However, it is possible for the above-mentioned light receiving sensor to have the device property which may vary depending on an environmental change, for example, a temperature change inside the device or a temperature change of the environment around the device, in addition to the deterioration with the lapse of time. In concrete terms, when the internal temperature rises during the operation of the apparatus, it is possible that an output value of the light receiving sensor may be lowered. Because of such change in the device property, the device may not hold a true read level such that it is possible that even a legitimate bill may be identified as a fake bill.

In the present invention, a paper sheet processing apparatus may be provided with which an authenticity judgment process of the paper sheet may be performed accurately even if the environmental change occurs.

Means to Solve the Problem

In the present invention, a paper sheet processing apparatus includes: an insertion slot into which a paper sheet is inserted; a sensor which detects insertion of the paper sheet from the insertion slot; a traveling route in which the paper sheet inserted from the insertion slot is conveyed; a light emitting part which irradiates the traveling route with light; a light receiving part which receives light from the traveling route; a black calibration part which sets a reference value for the lowest brightness of light with respect to light received by the light receiving part in a state where emission by the light emitting part is made ineffective; and an authenticity judgment processing part which judges an authenticity by comparing a plurality of pixel data obtained by converting the light received by the light receiving part into data per unit pixel having a predetermined size and including color information having brightness as the light emitting part irradiates the paper sheet traveling in the traveling route with the light with reference pixel data with respect to a legitimate paper sheet based on the reference value set by the black calibration part, wherein the black calibration part can set the reference value before the authenticity judgment processing part judges the authenticity after the sensor detects the insertion of the paper sheet every time when the paper sheet is inserted.

Further features of the present invention, its nature, and various advantages will be more apparent from the accompanying drawings and the following description of the preferred embodiment.

BRIEF DESCRIPTION OF THE DRAWINGS

FIG. 6 is a block diagram showing a configuration of control means which controls driving members of a bill conveyance mechanism, bill reading means, and the like.

DESCRIPTION OF NOTATIONS

Figure 1:
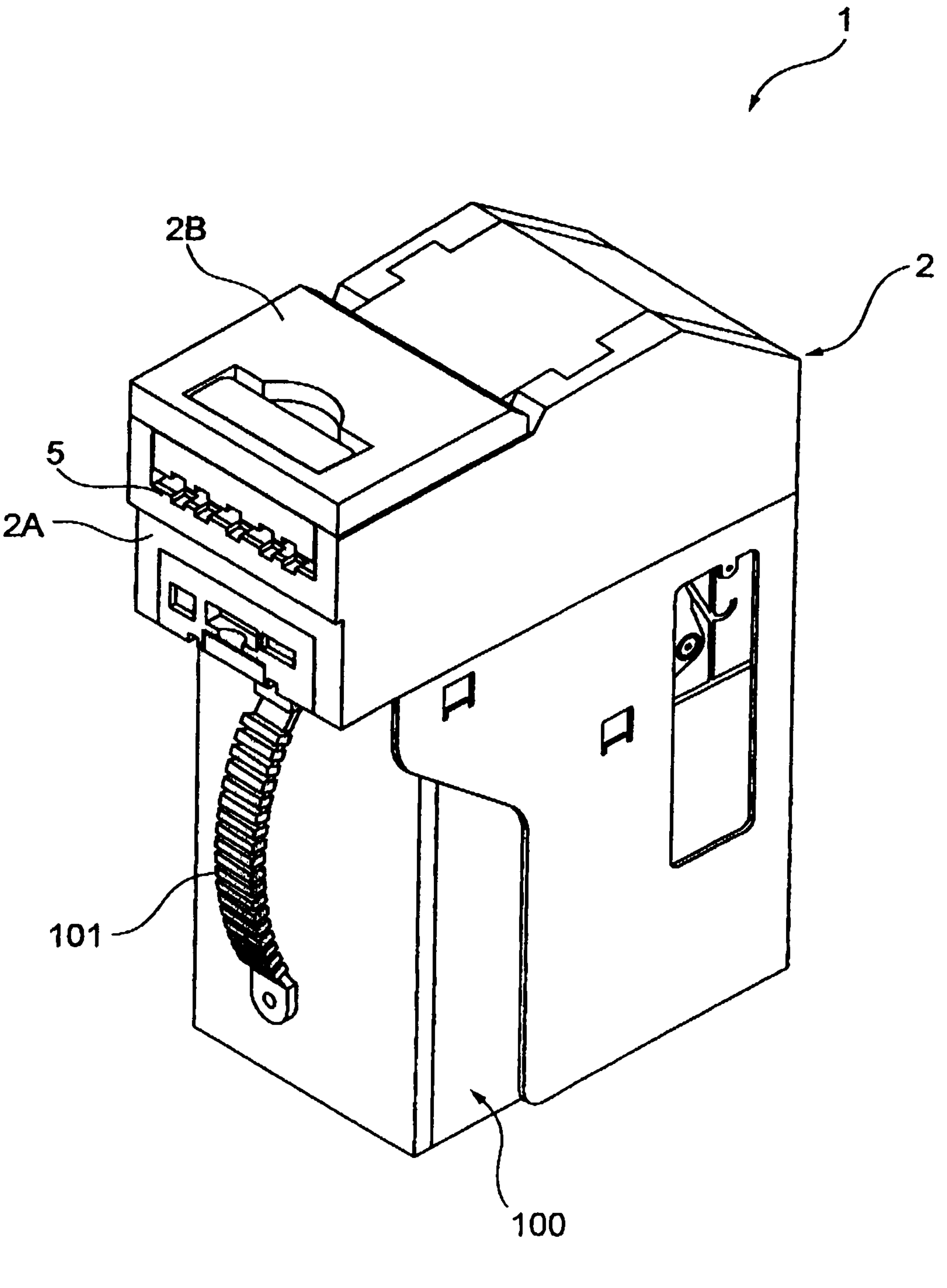
FIG. 1 is a perspective view showing an entire structure to illustrate a configuration of a bill processing apparatus of this embodiment.

1 bill processing apparatus
2 apparatus main body
3 bill traveling route
5 bill insertion slot
6 bill conveyance mechanism
8 bill reading means
10 skew correction mechanism
80*a* first light emitting part
81 light receiving/emitting unit
81*a* light receiving part
81*b* second light emitting part
200 control means

BEST MODE FOR CARRYING OUT THE INVENTION

Hereinafter, an embodiment of the present invention will be described with reference to the drawings.

Figure 2:
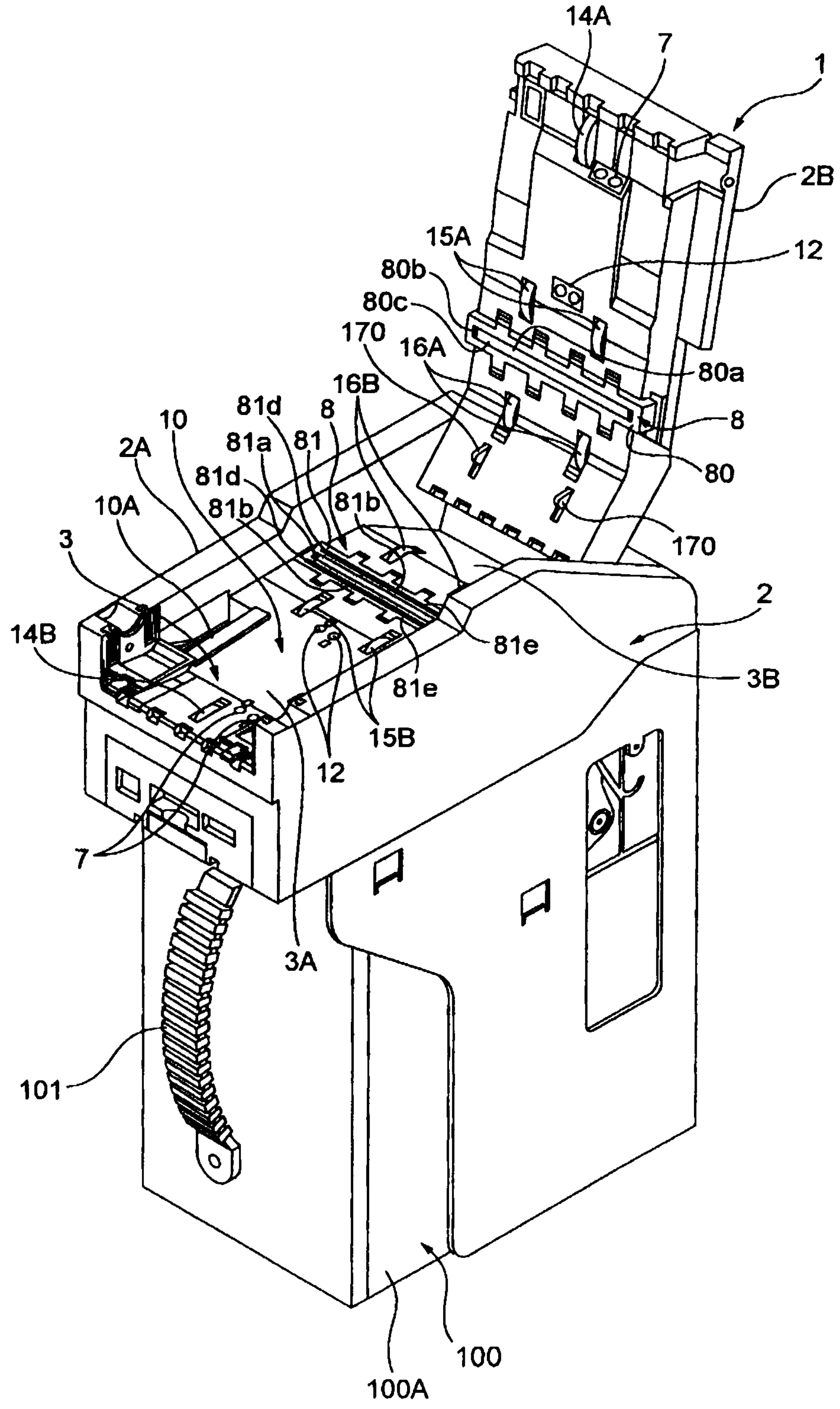
FIG. 2 is a perspective view showing the bill processing apparatus in a state that an open/close member is opened for a main body frame of an apparatus main body.
Figure 3:
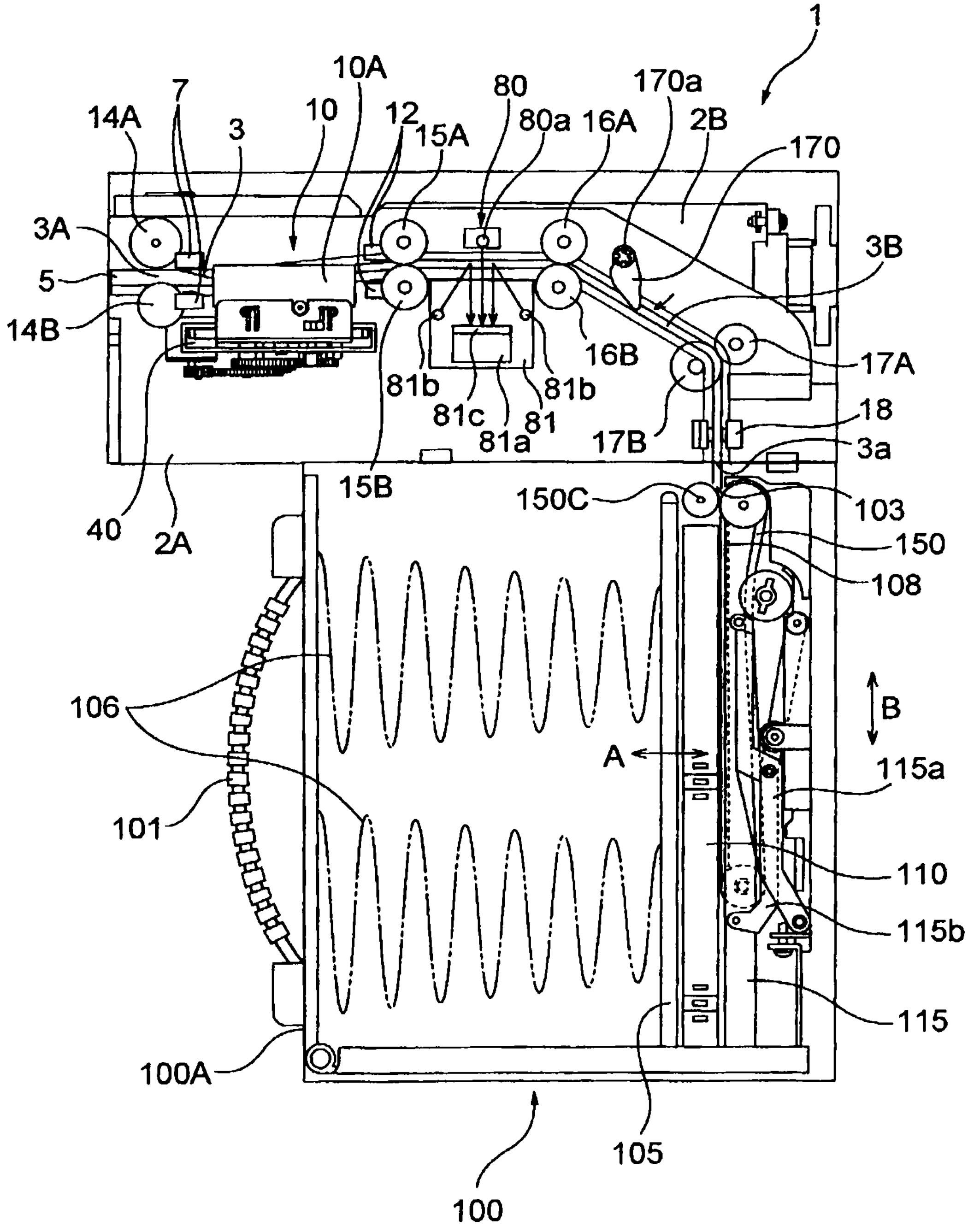
FIG. 3 is a right side view schematically showing a traveling route of a bill to be inserted from an insertion slot.
Figure 4:
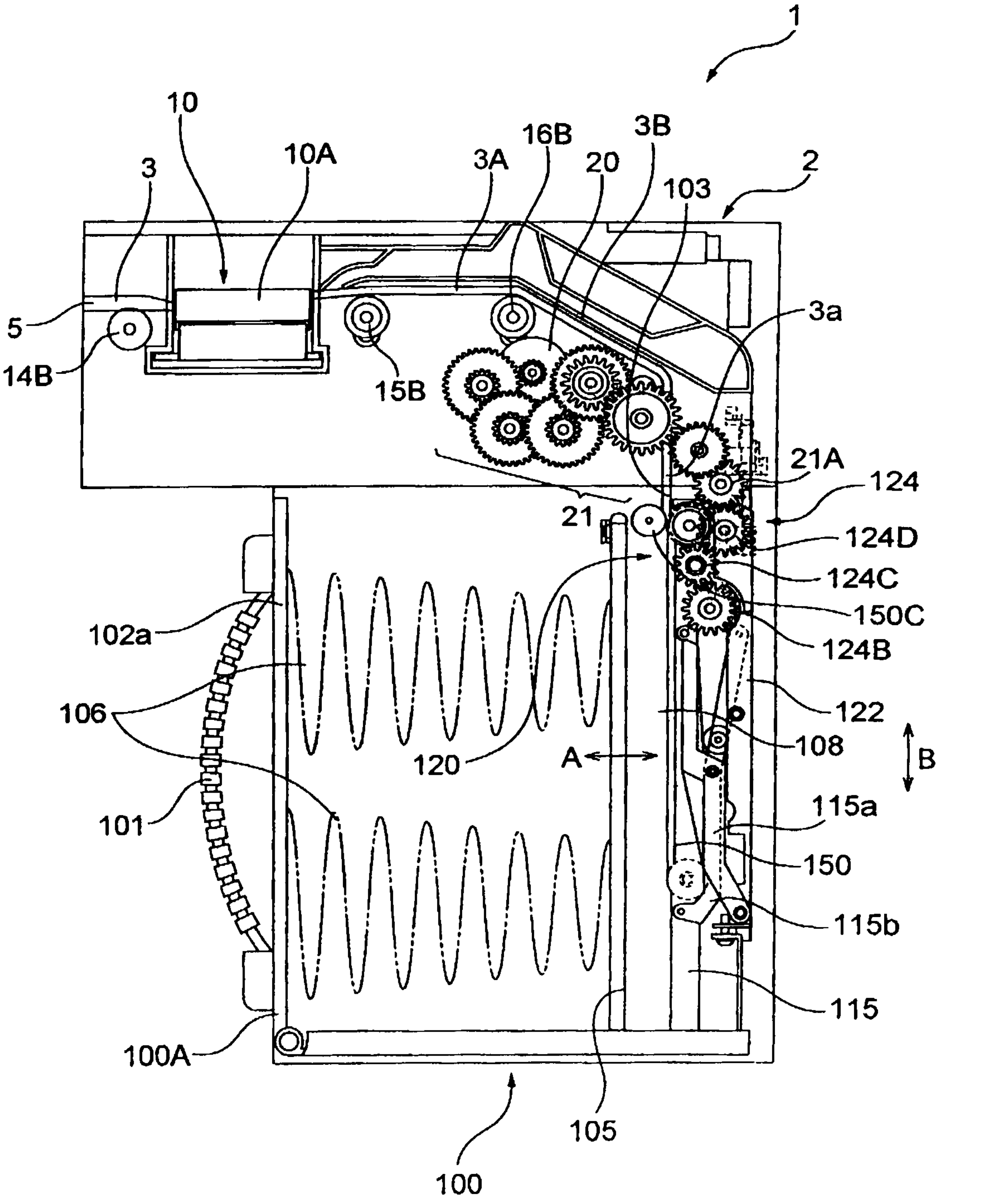
FIG. 4 is a right side view showing a schematic configuration of a power transmission mechanism for driving a presser plate arranged in a bill housing part.
Figure 5:
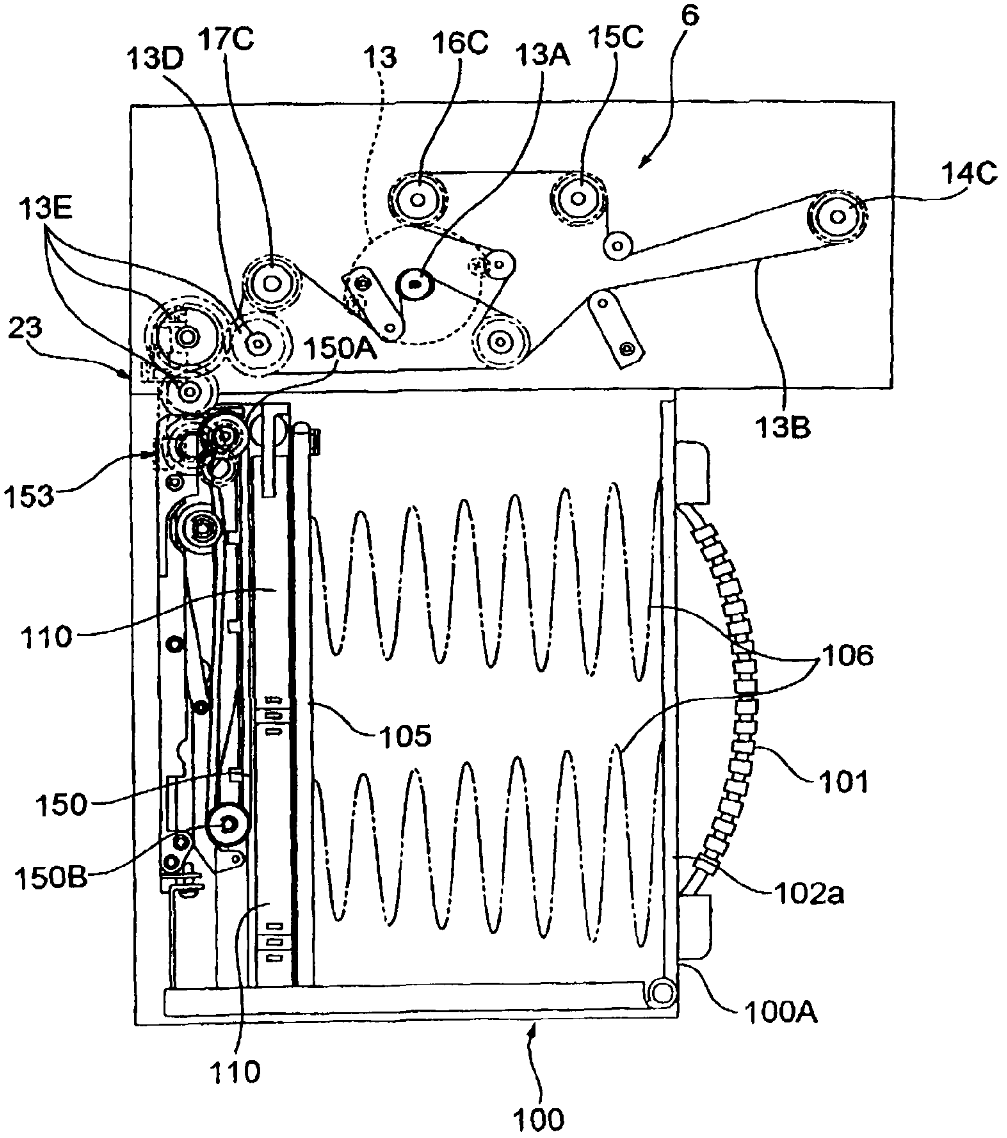
FIG. 5 is a left side view showing a schematic configuration of a driving source and a driving force transmission mechanism to drive a bill conveyance mechanism.

FIGS. 1 to 5 are diagrams showing a configuration of a bill processing apparatus according to this embodiment. FIG. 1 is a perspective view showing a general configuration thereof; FIG. 2 is a perspective view showing the bill processing apparatus in a state that an open/close member is opened for a main body frame of an apparatus main body; FIG. 3 is a right side view showing schematically a traveling route for a bill inserted from an insertion slot; FIG. 4 is a right side view showing schematically a power transmission mechanism for driving a presser plate installed in a bill housing part; and FIG. 5 is a left side view showing a schematic configuration of a driving source and a driving force transmission mechanism to drive a bill conveyance mechanism.

A bill processing apparatus 1 of this embodiment is so configured that it can be incorporated into, for example, various types of gaming machines such as a slot machine and the like, and the bill processing apparatus 1 includes an apparatus main body 2 and a housing part (stacker or cashbox) 100 which is provided to the apparatus main body 2 and is capable of stacking and housing a great number of bills. Here, the housing part 100 may be mountable to and demountable from the apparatus main body 2, and it is possible, for example, to remove it from the apparatus main body 2 by pulling a handle 101 provided on a front face thereof in a state that a lock mechanism (not shown) is unlocked.

As shown in FIG. 2, the apparatus main body 2 has a main frame body 2A and an open/close member 2B being configured to be opened and closed for the main body frame 2A by rotating around an axis positioned at one end thereof as a rotating center. Then, as shown in FIG. 3, the main body frame 2A and the open/close member 2B are configured to form a space (bill traveling route 3) through which a bill is conveyed such that both face each other across the space when the open/close member 2B is closed for the main body frame 2A, and to form a bill insertion slot 5 such that front exposed faces of both are aligned and that the bill traveling route 3 exits at the bill insertion slot 5. In addition, the bill insertion slot 5 is a slit-like opening from which a short side of a bill can be inserted into the inside of the apparatus main body 2.

Also, in the apparatus main body 2, a bill conveyance mechanism 6 that conveys a bill along the bill traveling route 3; an insertion detecting sensor 7 that detects the bill inserted into the bill insertion slot 5; bill reading means 8 that is installed on a downstream side of the insertion detecting sensor 7 and reads out information on the bill in a traveling sate; a skew correction mechanism 10 that accurately positions and conveys the bill with respect to the bill reading means 8; a movable piece passage detecting sensor 12 that detects that the bill passes through a pair of movable pieces constituting the skew correction mechanism; and a discharge detecting sensor 18 that detects that the bill is discharged into a bill housing part 100 are provided.

Hereafter, the respective components mentioned above will be described in detail. The bill traveling route 3 extends from the bill insertion slot 5 toward the inside, and comprises a first traveling route 3A and a second traveling route 3B extending from the first traveling route 3A toward the downstream side and being inclined downwardly at a predetermined angle to the first traveling route 3A. The second traveling route 3B is bent in a vertical direction on the downstream side and a discharge slot 3*a* from which the bill is discharged into the bill housing part 100 is formed at an end portion on the downstream side such that the bill discharged from the discharge slot 3*a* is fed into a feed port (receiving port) 103 of the bill housing part 100 in the vertical direction.

The bill conveyance mechanism 6 is a mechanism capable of conveying the bill inserted from the bill insertion slot 5 along the insertion direction, and of conveying back the bill in an insertion state toward the bill insertion slot 5. The bill conveyance mechanism 6 comprises a motor 13 (refer to FIG. 5) serving as a driving source installed in the apparatus main body 2; and conveyor roller pairs (14A and 14B), (15A and 15B), (16A and 16B), and (17A and 17B) which are installed with predetermined intervals along the bill traveling direction in the bill traveling route 3, and are driven to rotate by the motor 13.

The conveyor roller pairs are installed so as to be partially exposed on the bill traveling route 3, and all the pairs are constituted of driving rollers of the conveyor rollers 14B, 15B, 16B, and 17B installed on the underside of the bill traveling route 3 and driven by the motor 13; and pinch-rollers of the conveyor rollers 14A, 15A, 16A, and 17A installed on the upperside and driven by the these driving rollers. In addition, the conveyor roller pair (14A and 14B) to first nip and hold therebetween the bill inserted from the bill insertion slot 5, and to convey the bill toward the back side, as shown in FIG. 2, is installed in one portion of the center position of the bill traveling route 3, and a couple of the conveyor roller pairs (15A and 15B), (16A and 16B), or (17A and 17B) being disposed in this order in a longitudinal direction toward a downstream side thereof are respectively installed in a couple of portions with a predetermined interval in the lateral direction of the bill traveling route 3.

Further, the conveyor roller pair (14A and 14B) disposed in the vicinity of the bill insertion slot 5 is usually in a state that the upper conveyor roller 14A is spaced from the lower conveyor roller 14B, and the upper conveyor roller 14A is driven to move toward the lower conveyor roller 14B to nip and hold the inserted bill therebetween when insertion of the bill is detected by the insertion detecting sensor 7.

Thus, the upper conveyor roller 14A is controllably driven to be pressed against or spaced from the lower conveyor roller 14B by a motor 70 (refer to FIG. 6) for an up-and-down movement of the roller as a driving source. In this case, when a process (skew correction process) for positioning the bill with respect to the bill reading means 8 by eliminating inclination of the inserted bill is executed by the skew correction mechanism 10, the upper conveyor roller 14A is spaced from the lower conveyor roller 14B so as to release the load on the bill, and when the skew correction process is completed, the upper conveyor roller 14A is driven to move toward the lower conveyor roller 14B again to hold (or nip) the bill therebetween. Here, the driving source may be constituted of a solenoid or the like instead of a motor.

Further, the skew correction mechanism 10 comprises a pair of right and left movable pieces 10A (only one side is shown) such that the pair of right and left movable pieces 10A are moved to get closer with each other by driving a motor 40 for a skew driving mechanism, whereby the skew correction process is performed for the bill.

The conveyor rollers 14B, 15B, 16B, and 17B installed on the underside of the bill traveling route 3 are, as shown in FIG. 5, driven to rotate via the motor 13 and pulleys 14C, 15C, 16C, and 17C installed at the ends of the driving shafts of the respective conveyor rollers. That is, a driving pulley 13A is installed on the output shaft of the motor 13, and a driving belt 13B is wrapped around between the pulleys 14C, 15C, 16C, and 17C installed at the ends of the driving shafts of the respective conveyor rollers and the driving pulley 13A. In addition, tension pulleys are engaged in places with the driving belt 13B, which prevents the driving belt 13B from loosening.

In accordance with the configuration described above, when the motor 13 is driven to normally rotate, the conveyor rollers 14B, 15B, 16B, and 17B are driven to normally rotate in synchronization therewith to convey the bill toward the insertion direction. When the motor 13 is driven to reversely rotate, the conveyor rollers 14B, 15B, 16B, and 17B are driven to reversely rotate in synchronization therewith to convey back the bill toward the bill insertion slot 5 side.

The insertion detecting sensor 7 is to generate a detection signal when a bill inserted into the bill insertion slot 5 is detected. And when the detection signal is generated, the motor 13 is driven in a normal direction and the bill is conveyed in the insertion direction. The insertion detecting sensor 7 of this embodiment is installed between the pair of conveyor rollers (14A and 14B) and the skew correction mechanism 10 and comprises, for example, an optical sensor such as a regressive reflection type photo sensor. However, the insertion detecting sensor 7 may comprise a mechanical sensor other than the optical sensor.

Further, the movable piece passage detecting sensor 12 is to generate a detection signal when it is detected that a leading end of the bill passes through a pair of right and left movable pieces 10A constituting the skew correction mechanism 10, and when the detection signal is generated, the driving by the motor 13 is stopped such that the skew correction is made. The movable piece passage detecting sensor 12 of this embodiment is disposed on the upstream side from the bill reading means 8 and also comprises an optical sensor or a mechanical sensor in the same way as mentioned before with respect to the insertion detecting sensor.

Further, the discharge detecting sensor 18 is to detect a trailing end of the bill passing through such that it is detected that the bill is discharged into the bill housing part 100. The discharge detecting sensor 18 is disposed just in front of the receiving port 103 of the bill housing part 100 on the downstream side of the second traveling route 3B. When the detection signal is transmitted from the discharge detecting sensor 18, the driving by the motor 13 is stopped and the conveyance processing of the bill is terminated. The discharge detecting sensor 18 also comprises an optical sensor or a mechanical sensor in the same way as the aforementioned insertion detecting sensor.

The bill reading means 8 reads bill information on the bill conveyed in a state that the skew is eliminated by the skew correction mechanism 10, and determines the validity (authenticity). In this embodiment, the bill reading means 8, which is installed in the above-mentioned first traveling route 3A, comprises a line sensor which irradiates the bill being conveyed from top and bottom sides thereof with light such that a transmitted light and a reflected light thereof are detected by a light receiving part so as to perform reading.

Here, the configuration of above-mentioned reading means 8 will be described in detail with reference to FIGS. 2 and 3.

The abovementioned bill reading means 8 has a light emitting unit 80 which is installed on the side of the open/close member 2B and provided with a first light emitting part 80*a* capable of irradiating the upper side of the bill to be conveyed with the infrared light and the red light, and a light receiving/emitting unit 81 which is installed on the side of the main body frame 2A.

The light receiving/emitting unit 81 has a light receiving part 81*a* which is provided with a light receiving sensor facing the first light emitting part 80*a* across the bill (bill traveling route) and second light receiving parts 81*b* which are installed adjacently on the both sides of the light receiving part 81*a* along the bill traveling direction and are capable of irradiating the object with the infrared light and the red light.

The first light emitting part 80*a* disposed to face the light receiving part 81*a* works as a light source for the transmissive light. This first light emitting part 80*a* is, as shown in FIG. 2, comprised of a rectangular bar-like body made of synthetic resin which emits the light guided through a light guiding body 80*c* provided inside from an LED element 80*b* fixed to one end of the bar-like body. The first light emitting part having such a configuration is linearly installed in parallel with the light receiving part 81*a* (light receiving sensor) so as to be capable of entirely and equally irradiating the entire range in the width direction of the traveling route of the bill to be conveyed although the configuration is simple.

The light receiving part 81*a* of the light receiving/emitting unit 81 is formed in a thin-walled plate shape having a band shape extending in a lateral direction of the bill traveling route 3 and having a width to an extent that the sensitivity of the light receiving sensor (not shown) provided in the light receiving part 81*a* is not affected. In addition, the light receiving sensor is configured as a so-called line sensor in which a plurality of CCDs (Charge Coupled Devices) are provided linearly in the center in the thickness direction of the light receiving part 81*a*, and a GRIN lens array 81*c* is disposed linearly above these CCDs so as to collect the transmitted light and the reflected light.

The second light emitting part 81*b* of the light receiving/emitting unit 81 works as a light source for the reflection light. This second light emitting part 81*b* is, in a similar manner as the first emitting part 80*a*, comprised of a rectangular bar-like body made of synthetic resin which emits the light guided through a light guiding body 81*e* provided inside from an LED element 81*d* fixed to one end of the bar-like body. The second light emitting part 81*b* is also configured to be linearly installed in parallel with the light receiving part 81*a* (line sensor).

The second light emitting parts 81*b* are capable of irradiating the bill with the light at an elevation angle of 45 degrees, for example, and are so installed that the light receiving part 81*a* may receive the reflected light from the bill. In this case, the lights irradiated to the bill by the second light emitting parts 81*b* are to be made incident at 45 degrees onto the light receiving part 81*a*, but the incident angle is not limited to 45 degrees such that the arrangement may be re-arranged as appropriate as long as the lights are irradiated evenly without shading to the surface of the bill. Therefore, the arrangement of the second light emitting parts 81*b* and the light receiving part 81*a* may be appropriately changed in design in accordance with the structure of the bill processing apparatus.

Further, the second light emitting parts 81*b* are disposed on the both sides of the light receiving part 81*a* so as to be disposed across the light receiving part 81*a* and irradiate the bill with the respective lights at respective incident angles of 45 degrees. This is because, in the case where the surface of the bill has scratches or folded wrinkles, and in the case where the light is irradiated only from one side to an uneven surface generated by these scratches or folded wrinkles, it is unavoidable to make some portions shaded to cause shadow in the uneven surface. Therefore, the shadows made in the uneven surface may be prevented by irradiating the lights from the both sides, whereby the image data to be acquired can have a higher degree of precision than that acquired by the single side irradiation. Here, the second light emitting part 81*b* may be configured to be installed only on one side, and the configuration, the arrangement, and the like of the light emitting unit 80 and the light receiving/emitting unit 81 as described above are not limited to those described in this embodiment, and may be modified as appropriate.

An authenticity judgment process is conducted by comparing image data obtained by reflected light (irradiated light by the second light emitting part 81*b*) and transmitted light (irradiated light by the first light emitting part 80*a*) from the bill which are acquired by the above-mentioned light receiving part 81*a* with the image data of the legitimate bill. In this case, since the legitimate bill has some area from which different image data are acquired depending on the wavelengths of the lights (for example, visible light or infrared light) irradiated to the area, in the authenticity judgment process in this embodiment, a plurality of light sources, in consideration of this view point, irradiate different lights of different wavelengths (in this embodiment, a red light and an infrared light are irradiated) to the bill and a transmitted light therethrough and a reflected light thereon are detected such that the authenticity identification accuracy may be improved. That is, since the red light and the infrared light have different wavelengths, transmitted-light data and reflected-light data from a plurality of lights of different wavelengths may be utilized for the bill authenticity judgment whereby the judgment may use the nature that the transmittance of the transmitted light transmitted through the specific area and the reflectance of the reflected light reflected on the specific area in the legitimate bill are different from those of the counterfeit bill. Therefore, in the above-mentioned light emitting part (first light emitting part 80*a* and second light emitting part 81*b*), an attempt is made to further improve the bill authenticity identification accuracy by employing light sources where a plurality of wavelengths are available.

Here, since it is possible to acquire various kinds of received-light data (transmitted-light data and reflected-light data) depending on the wavelengths of the irradiated lights to the bill and the irradiated areas of the bill, although a concrete bill authenticity identification method will not be written in detail, the image appears greatly different depending on the lights in a watermark area of the bill, for example, if an image on the area is viewed with the lights of different wavelengths. Therefore, it can be considered that the bill to become an identification object is identified as the legitimate bill or the counterfeit bill by setting this portion as the specified area, acquiring transmitted-light data and reflected-light data from the specified area, and comparing such data with legitimate data from the same specified area of the legitimate bill having been stored in advance in storage means such as ROM. At this time, provided that specified areas are predetermined according to the kinds of the bills, and that predetermined weighting may be applied to the transmitted-light data and the reflected-light data from this specified area, the authenticity identification accuracy may be improved.

In addition, the above-mentioned light emitting part (first light emitting part 80*a* and second light emitting part 81*b*) is controlled to light with a predetermined interval and transmitted light and reflected light are detected by the light receiving part (line sensor) 81*a* when the bill passes. The light receiving part (line sensor) 81*a* can acquire contrasting density data (a plurality of pixel data per a predetermined size as a unit which include brightness data) in accordance with the brightness and it is also possible to generate two-dimensional image from such pixel data.

In this case, the image data acquired by the line sensor is converted into data containing color information having brightness for each pixel by a converter which will be described later. In addition, the color information of each pixel having brightness to be converted by the converter corresponds to a contrasting density value, i.e., a density value (luminance value), and a numerical value from 0 to 255 (0: black to 255: white) is allocated to each pixel, for example, as information of one byte according to its density value.

Therefore, in the authenticity judgment process, the predetermined area of the bill may be extracted; the pixel information (density values) contained in the area and the pixel information in the same area of the legitimate bill may be used so as to be substituted into an appropriate correlating equation; and then a coefficient of correlation may be obtained by carrying out an operation thereof, whereby the authenticity identification may be judged by the coefficient. Or, in addition to the above description, analog waveforms, for example, may be generated from the transmitted-light data and the reflected-light data, and the respective shapes of those waveforms may be compared with each other, whereby the authenticity identification may be judged by such comparison. Moreover, a process in which the length of the printed area of the bill is detected and the authenticity thereof is identified by utilizing the length information may be provided.

Further, the black calibration is conducted to correct the reference value of the output for the lowest brightness in the above-mentioned light receiving part (line sensor) 81*a* before the conveyed bill is read out. This black calibration is, as described later, to be conducted before it is started that the bill is actually read out after the bill having been inserted from the bill insertion slot 5 is detected by the insertion detecting sensor 7 at every time when the bill is inserted.

The black calibration is performed by the black calibration part (black calibration operation circuit) connected to the light receiving part 81*a*, and it is executed by acquiring an output from the light receiving part 81*a* in as state that the light emission from the light emitting part (first light emitting part 80*a* and second light emitting part 81*b*) is made ineffective, for example, when the light emitting part is controlled to be off, before the reading process of the inserted bill is conducted. In concrete terms, a detection signal from the light receiving part 81*a* (detection signal detected in the state that light emission by the light emitting part is made to be ineffective) is converted into pixel information, which is set as the reference brightness (reference value) and stored. The reference value of brightness having been set by the black calibration part is made to be the reference value for the lowest brightness when bill information from the light emitting part 81*a* is actually detected and converted into pixel information, and the output value from the light emitting part 81*a* is corrected to be in an appropriate level. The light receiving part may be configured to be shielded, as a means for making the emission from the light emitting part to be ineffective, such that the light receiving part 81*a* would not receive the light from the light emitting part even if any one of the light emitting parts is turned on.

As described above, the black calibration is performed by the light receiving part 81*a* in a condition that the light emitting part would emit any light such that the reference value for the lowest brightness is set with respect to the brightness of the light received by the light receiving part 81*a* at every time of reading the bill. That is, even if an output value from the light receiving part varies according to the environment change and the like of the inside of the device and the device property of the light receiving part 81*a*, it is possible to conduct the above-mentioned authenticity judgment process based on the correct brightness with respect to the information obtained by reading out the bill since the output value is corrected as the reference value of the brightness is corrected (black correction) with the black calibration at the above-mentioned black calibration part.

The actual authenticity judgment process is performed by obtaining the reference pixel data of the legitimate bill having been stored in advance in an ROM or the like, and the reflected light data of the reflected light and the transmitted light data of the light transmitted from the conveyed bill, a surface printing area of which the light emitting part (first light emitting part 80*a* and second light emitting part 81*b*) irradiates with light of a predetermined wavelength, and comparing these data with the pixel data having the appropriate brightness which has been corrected with the black calibration.

Here, a multi-feed judging part is provided in this embodiment, and the multi-feed judging part determines whether bills are conveyed in a double feed condition or not and whether the leading end portion is folded or not by comparing a density value for each pixel in the leading end portion of the bill having been read out by the line sensor with a density value for each reference pixel corresponding to the thus-read portion, in consideration that the line sensor can read out the entire width of the bill and the two-dimensional image can be acquired as the bill is conveyed.

Even if an environmental change or the like takes place as described above so that the brightness of the light received data of the bill having been read changes, it is possible to lower the probability for a multi-feed judging part to judge a bill in an appropriate condition erroneously as bills in a double feed condition by providing such multi-feed judging part since the above-described black calibration is implemented every time when the bill is inserted.

The bill housing part 100 which sequentially stacks and houses bills having been identified as being legitimate by the above-mentioned bill reading means 8 will be explained.

As shown in FIGS. 3 to 5, the main body frame 100A constituting the bill housing part 100 is formed into a substantially rectangular parallelepiped (or cuboid) shape, and one end of bias means (e.g., bias spring) 106 is attached to an interior side of a front wall 102*a* thereof, and a placing plate 105 on which bills to be fed via the above-described receiving port 103 are sequentially stacked is provided to the other end thereof. Therefore, the placing plate 105 is in a state that it is pressed toward the presser plate 115, which will be described later, by the bias means 106.

In the main body frame 100A, a press standby part 108 that keeps a dropping bill as it falls is provided so as to continuously communicate with the receiving port 103. A pair of regulatory members 110 are disposed on both sides of the press standby part 108, respectively, the regulatory members 110 extending in a vertical direction. An opening is formed between the pair of regulatory members 110 such that the presser plate 115 passes through the opening as bills are successively stacked onto the placing plate 105.

Further, the presser plate 115 that presses toward the placing plate 105 a bill falling into the press standby part 108 from the receiving port 103 is installed in the main body frame 100A. The presser plate 115 is formed in such a size that it may be capable of reciprocating through an opening formed between the pair of regulatory members 110, and gets into the opening so as to be driven to reciprocate between a position where the bills are pressed against the placing plate 105 (a pressing position) and another position where the press standby part 108 is opened (an initial position). In this case, the bill passes through the opening as being flexibly bent in a pressing operation of the presser plate 115 and is then placed on the placing plate 105.

The presser plate 115 is driven to reciprocate as described above via a presser plate driving mechanism 120 installed in the main body frame 100A. The presser plate driving mechanism 120 comprises a pair of link members 115*a* and 115*b* having respective ends thereof supported pivotally by the presser plate 115 so as to allow the presser plate 115 to reciprocate in an arrow A direction in FIGS. 3 and 4, and these link members 115*a* and 115*b* are connected in a shape of letter "X", and the other ends opposite to the respective ends are supported pivotally by a movable member 122 installed movably in a vertical direction (an arrow B direction). A rack is formed in the movable member 122, and a pinion constituting the presser plate driving mechanism 120 is geared (engaged) with the rack.

As shown in FIG. 4, a housing part side gear train 124 constituting the presser plate driving mechanism 120 is connected to the pinion. For this case, as shown in FIG. 4, in this embodiment, a driving source (a motor 20) and a main body side gear train 21 sequentially engaged with the motor 20 are installed in the above-described apparatus main body 2, and when the bill housing part 100 is mounted to the apparatus main body 2, the main body side gear train 21 is to be connected to the housing part side gear train 124. That is, the housing part side gear train 124 comprises a gear 124B installed on the same axis of the pinion and gears 124C, 124D to be engaged sequentially with the gear 124B, and when the bill housing part 100 is mounted to and demounted from the apparatus main body 2, the gear 124D is configured to be engaged with and disengaged from a final gear 21A of the main body side train 21.

As a result therefrom, the presser plate 115 is driven to reciprocate in the arrow A direction as the motor 20 installed in the apparatus main body 2 is driven to rotate so as to drive the main body side train 21 and in turn the presser plate driving mechanism 120 (the housing part side gear train 124, the rack installed onto the movable member 122, and the link members 115*a*, 115*b*, etc.).

Conveyor members 150 which are capable of touching the bill conveyed-in from the receiving port 103 are installed in the main body frame 100A. The conveyor members 150 take their own role to contact the bill conveyed-in so as to stably guide the bill to an appropriate position in the press standby part 108 (position where the bill can be stably pressed without causing the bill to be moved to the right or left side when the bill is pressed by the presser plate 115). In this embodiment, the conveyor members are constituted of belt-like members (hereafter called belts 150) installed so as to face the press standby part 108.

In this case, the belts 150 are installed so as to extend along the conveying-in direction with respect to the bill, and are wrapped around the pair of pulleys 150A and 150B supported rotatably on both ends in the conveying-in direction. Further, the belts 150 contact a conveyor roller 150C extending in an axis direction which is supported rotatably in the region of the receiving port 103, and the belts 150 and the conveyor roller 150C nip and hold the bill conveyed-in the receiving port 103 therebetween to guide the bill directly to the press standby part 108. Moreover, in this embodiment, the pair of belts 150 are provided on the right and left sides, respectively, across the above-described presser plate 115 in order to be capable of contacting the surface on left and right sides of the bill. Here, the belts 150 may be prevented from loosening by not only being wrapped around the pulleys 150A and 150B at the both ends, but also causing tension pulleys to push the belts 150 at the intermediate positions, respectively.

The pair of belts 150 are configured to be driven by the motor 13 that drives the above-described plurality of conveyor rollers installed in the apparatus main body 2. In detail, as shown in FIG. 5, the above-described driving belt 13B driven by the motor 13 is wrapped around a pulley 13D for the driving force transmission, and a gear train 153 installed at the end of the spindle of the pulley 150A supported rotatably on the receiving port 103 side is engaged with a gear train 13E for the power transmission sequentially installed onto the pulley 13D. That is, when the bill housing part 100 is mounted to the apparatus main body 2, an input gear of the gear train 153 is configured to be engaged with a final gear of the gear train 13E, and the pair of belts 150 are configured to be driven to rotate in a synchronized manner with the above-described conveyor rollers 14B, 15B 16B, and 17B for conveying the bill by driving the motor 13 to rotate.

As described above, when the bill is inserted into the inside via the bill insertion slot 5, the bill is moved inside the bill traveling route 3 by the bill conveyance mechanism 6. The bill traveling route 3 is extended from the bill insertion slot 5 toward the back side, as shown in FIG. 3, and comprises a first traveling route 3A and a second traveling route 3B which is extended from the first traveling route 3A toward downstream side and is inclined at a predetermined angle to the first traveling routes 3A.

Further, a pull-out preventing member (shutter member) 170 that prevents the bill from being conveyed toward the bill insertion slot 5 is installed in the second traveling route 3B. The pull-out preventing member 170 is biased to rotate in the arrow direction of FIG. 3 (a direction in which the second traveling route 3B is closed) via a spindle 170*a*, and when the bill moves toward the side of the bill housing part 100, the pull-out preventing member 170 is rotated so as to open the second traveling route against the biasing force, and when the bill once passes through the second traveling route, the pull-out preventing member 170 is rotated in the arrow direction to close the second traveling route 3B. That is, when the rear end of the bill passes through the pull-out preventing member 170, the second traveling route 3B is closed by the pull-out preventing member 170, not to allow the bill to be drawn out.

In addition, such pull-out preventing members may be installed at a plurality of places along the traveling route on the downstream side of the bill reading means 8. Further, their installing positions may be on the side downstream from the position at which the bill is stopped at the time of carrying out the bill authenticity judgment process (an escrow position; a position on the downstream side by approximately 13 mm from the bill reading means 8 in this embodiment).

Next, control means 200 that controls the driving of the bill conveyance mechanism 6, the bill reading means 8 and the like as mentioned above will be described with reference to a block diagram of FIG. 6.

Figure 6:
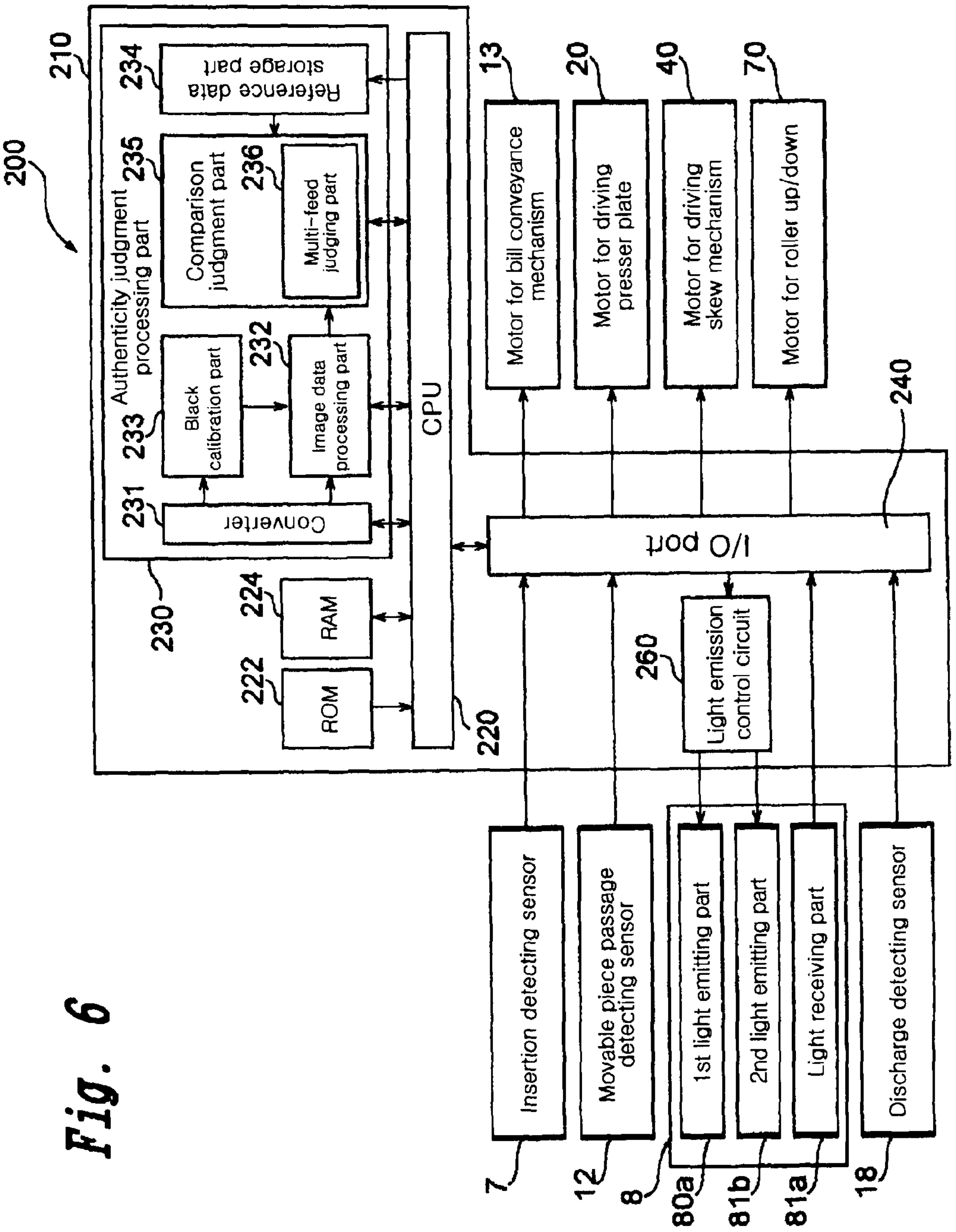
Figure 7:
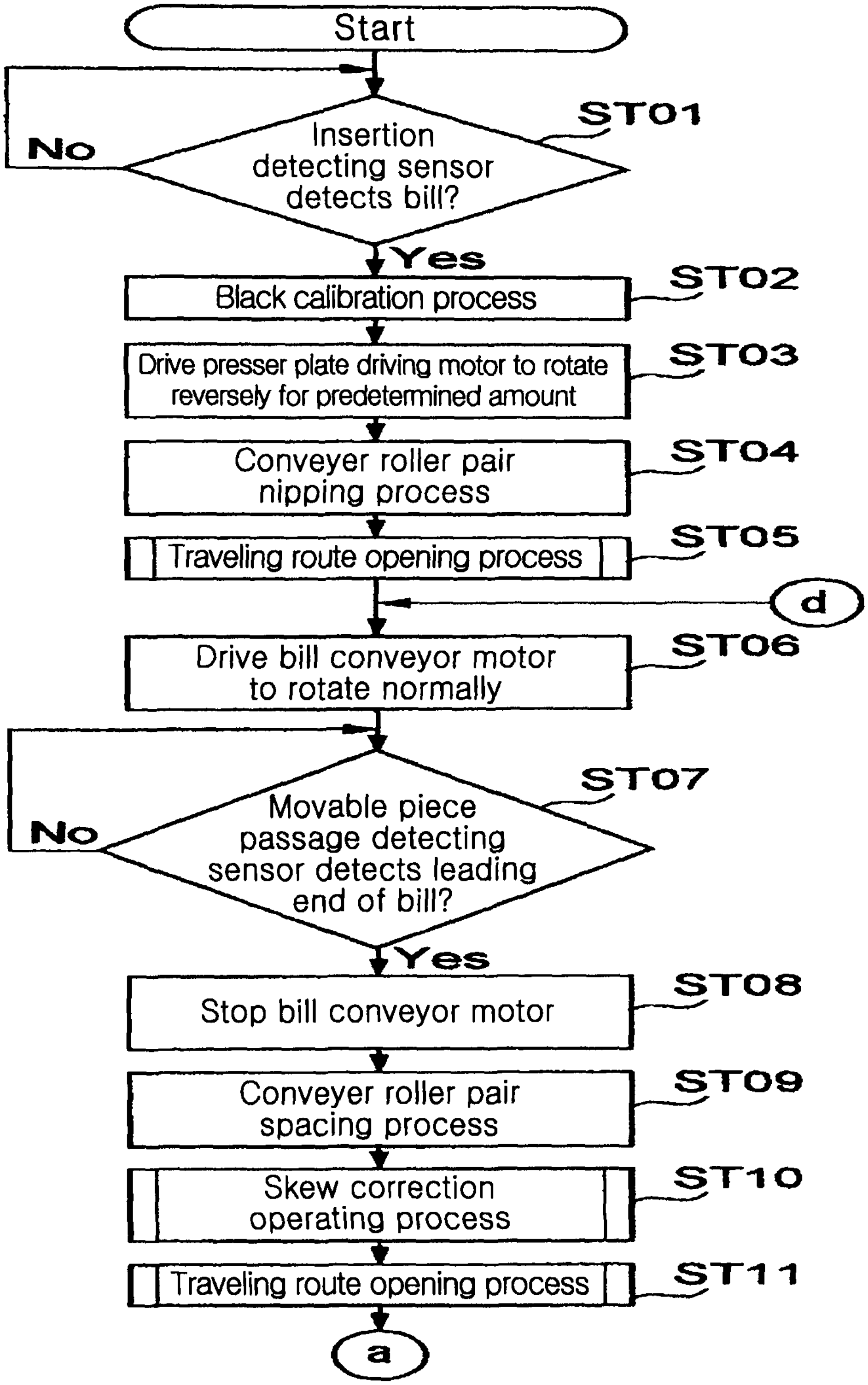
FIG. 7 shows a flowchart (part one) illustrating processing operations for processing a bill in a bill processing apparatus of this embodiment.
Figure 8:
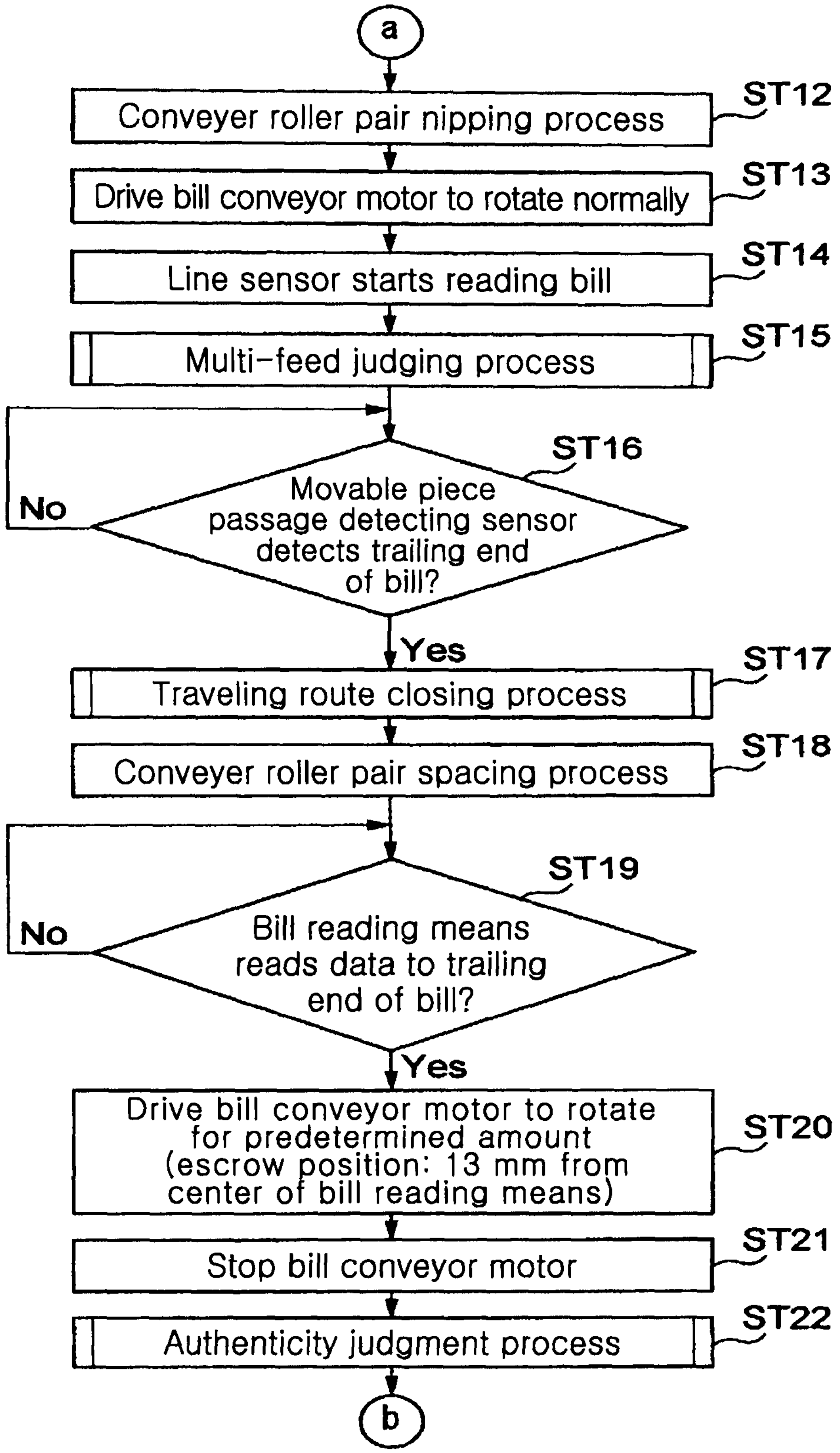
FIG. 8 shows a flowchart (part two) illustrating processing operations for processing the bill in the bill processing apparatus of this embodiment.
Figure 9:
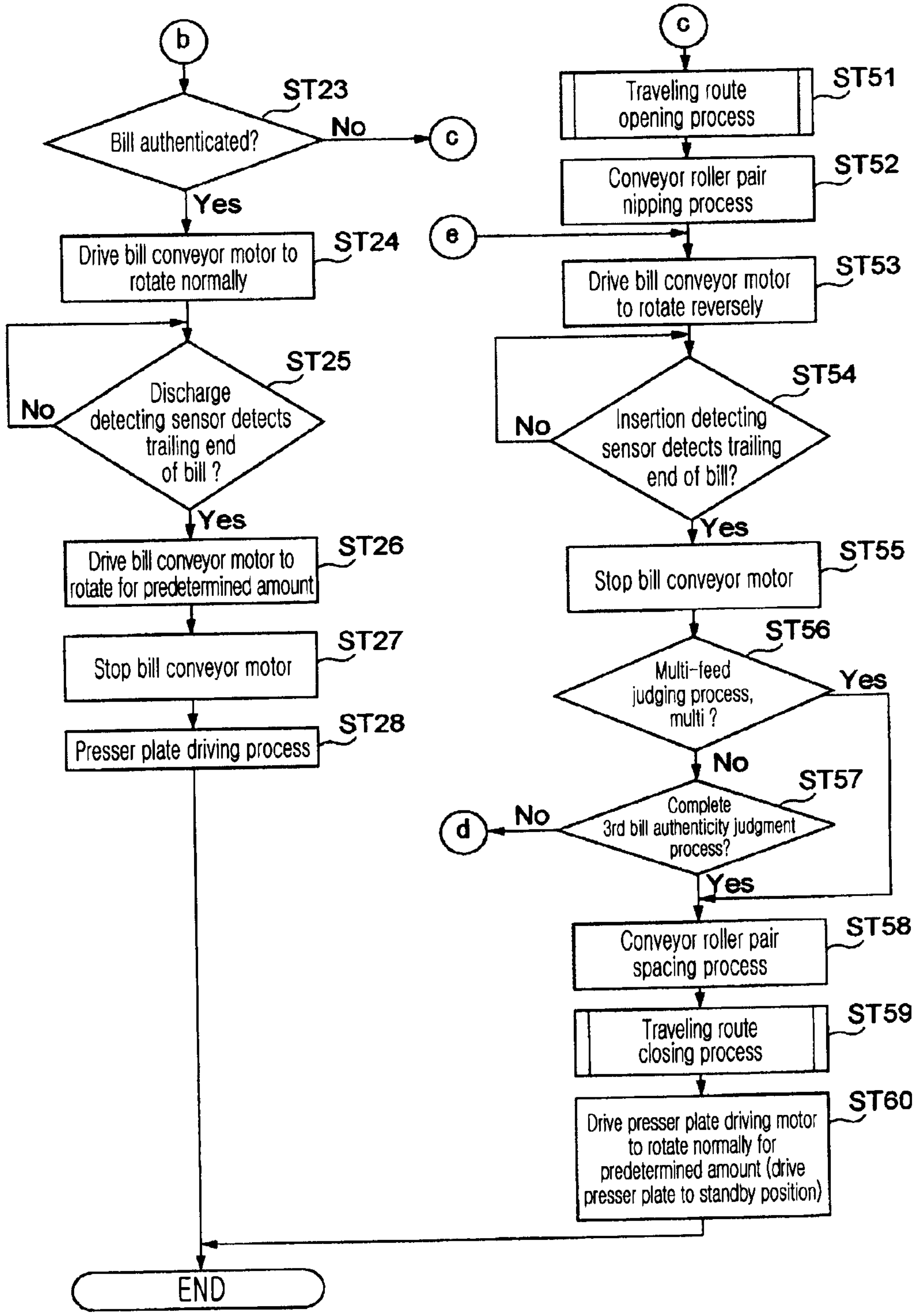
FIG. 9 shows a flowchart (part three) illustrating processing operations for processing the bill in the bill processing apparatus of this embodiment.

The control means 200 as shown in a block diagram of FIG. 6 comprises a control board 210 which controls the operations of the above-described respective drive units, and a CPU (Central Processing Unit) 220 controlling driving of each drive unit and constituting the bill identification means, a ROM (Read Only Memory) 222, a RAM (Random Access Memory) 224, and an authenticity judging part 230 are implemented on the control board 210.

In the ROM 222, permanent data such as various types of programs such as a multi-feed judging program for judging a double feed or a folded feed at a leading end portion of the bill; an authenticity judgment program by the authenticity judging part 230, operation programs for the respective drive units such as the motor 13 for the bill conveyance mechanism, the motor 20 for the presser plate, the motor 40 for the skew correction mechanism, and the roller up-and-down motor 70 for lifting up and down rollers; and the like are stored.

The CPU 220 operates according to the programs stored in the ROM 222, and carries out input and output of the signals with respect to the respective drive units described above via an I/O port 240, so as to perform the entire operational control of the bill processing apparatus. That is, the motor 13 for the bill conveyance mechanism, the motor 20 for the presser plate, the motor 40 for the skew correction mechanism, and the roller up-and-down motor 70 are connected to the CPU 220 via the I/O port 240, and the operations of these drive units are controlled by control signals transmitted from the CPU 220 in accordance with the operation programs stored in the ROM 222. Further, the CPU 220 is so configured that detection signals from the insertion detecting sensor 7, the movable piece passage detecting sensor 12, and the base part detecting sensor 18 are input into the CPU 220 via the I/O port 240, and the driving of the respective drive units is controlled based on these detection signals.

Moreover, the CPU 220 is so configured that a detection signal based on the transmitted light and the reflected light of the light which is irradiated to the bill as the identification object is input into the CPU 220 via the I/O port 240 from the light receiving part 81*a* in the bill reading means 8 as described. The first light emitting part 80*a* and the second light emitting parts 81*b* in the bill reading means 8 are controlled through a light emission control circuit 260 by a control signal from the CPU 220 in accordance with the operation programs stored in the abovementioned ROM 222 such that the lighting interval and the turning-off are controlled.

Further, a detection signal which is transmitted from the light receiving part 81*a* in the above-mentioned bill reading means 8 in a condition that the emission from the light emitting part (first light emitting part 80*a* and second light emitting part 81*b*) is made to be ineffective as the black calibration, which will be described later, is performed is input into the CPU 220 via the I/O port 240, and, that is, the detection signal is to be input as the light is received from the traveling route in a condition that no emission of the light emitting part is made for the sake of convenience.

The RAM 224 temporarily stores data and programs used for the CPU 220 to operate, and also acquires and temporarily stores the received light data (image data constituted of a plurality of pixels) of the bill serving as the identification object.

The above-mentioned authenticity judging part 230 has a function to judge whether the conveyed bill is legitimate or not, and whether the conveyed bill is in a condition that the leading end thereof is folded or whether the conveyed bill is in a double feed condition. The authenticity judgment processing part 230 comprises: a converter 231 which converts the received light data of the identification object stored in the RAM 224 into pixel information containing color information having brightness (density value) for each pixel, an image data processing part 232 which acquires image data based on the pixel information converted by the converter 231, and a black calibration part 233 which conducts a black calibration before starting to read the bill, which has been inserted from the bill insertion slot 5.

At the black calibration part 233, the black calibration is implemented by acquiring a detection signal from the light receiving part 81*a* in a state that the light emission from the light emitting part (first light emitting part 80*a* and second light emitting part 81*b*) is made to be ineffective, for example, while the light emitting part is controlled to be turned off by a light emission control circuit 260. Thus, the reference value for the lowest brightness is set with respect to the brightness of the light received by the light receiving part 81*a* at every time of the bill reading processing.

Further, the bill determination processing part 230 comprises: a reference data storage part 234 in which the reference data of the legitimate bill (pixel data of the legitimate bill) is stored, and a comparison judgment part 235 which compares the image data (pixel data) of the bill having been corrected in the image data processing part 232 with the reference data (reference pixel data) stored in the reference data storage part 234, and carries out the determination process to determine whether the bill being conveyed is legitimate or not.

In this case, the reference data storage part 234 stores image data about the legitimate bill to be used, when the above-mentioned authenticity judgment process is carried out, and, in addition thereto, various kinds of reference data for respective kinds of bills to be utilized in the authenticity judgment, for example, reference values and the like of the printing length of the legitimate bill. Here, data which can be the reference data is stored in the dedicated reference data storage part 234. However, the data may be stored in the above-mentioned ROM 222.

Moreover, the comparison judgment part 235 comprises a multi-feed judging part 236 which compares a density value per a pixel in the leading end portion of the bill having been read by the light emitting part 81*a* with a density value (density value stored in the reference data storage part 234) per a pixel as a unit corresponding to each portion having been read, and determines whether the bill is conveyed in a folded condition at the bill leading portion or not and whether bills are conveyed in a double feed conditions or not.

The actual authenticity judgment process in the above-mentioned authenticity judgment processing part 230 is performed by irradiating a printing area on the surface of the bill being conveyed with light of a predetermined wavelength from the light emitting part (first light emitting part 80*a* and second light emitting part 81*b*), converting the reflected light data of the light reflected and the transmitted light data of the light transmitted from the bill into a plurality of pixel data having the brightness data per a predetermined size as the unit in the converter 231, and comparing such data with the reference pixel data of the legitimate bill stored in advance with the reference data storage part 234. In this case, with respect to individual brightness in a plurality of pixel data converted by the converter 231, it is possible to lower the probability to judge erroneously the legitimate bill as the fake one when the comparison judgment is implemented since the correction is made on the basis of reference value having been set to the appropriate brightness by the black calibration part 233.

That is, with respect to image data (a plurality of pixel data including brightness information) acquired by the image data processing part 232, a reference value of the brightness is corrected (black calibration) by the black calibration part 233 before a reading process of the image data is performed, and the image data based on the reference value subject to the black calibration is used for the authenticity judgment process. Therefore, even if the acquired image data of the bill come to represent darker as the output from the light receiving part 81*a* serving as a light receiving sensor becomes weaker because of some factors such as an environmental temperature rise, for example, during the operation of the device, it is possible to conduct the authenticity judgment process appropriately since the reference value of the brightness of the light receiving part is corrected in accordance with such factors.

Next, the bill processing operation in the bill processing apparatus 1 executed by the control means 200 will be described according to the flowcharts of FIGS. 7 to 13.

When an operator inserts a bill into the bill insertion slot 5, the conveyor roller pair (14A and 1413) installed in the vicinity of the bill insertion slot is in a state that the rollers are spaced from each other in an initial stage (refer to ST18 and ST58 to be described later). Further, with respect to the presser plate 115, the pair of link members 115*a* and 115*b* driving the presser plate 115 are located at the press standby part 108, and the presser plate 115 is positioned in the standby position such that the bill cannot be conveyed-in the press standby part 108 from the receiving port 103 by the pair of link members 115*a* and 115*b*. That is, in this state, the presser plate 115 is brought into the opening formed between the pair of regulatory members 110 such that the condition is so made as to prevent the bills stored in the bill housing part from being drawn out through the opening.

Moreover, the pair of movable pieces 10A constituting the skew correction mechanism 10 located on the downstream side of the conveyor roller pair (14A, 14B) are in a state that the pair of movable pieces 10A are moved to leave the minimum open width therebetween (for example, an interval between the pair of movable pieces 10A is 52 mm; refer to ST17 and ST59 to be described later) so as to prevent the bill from being drawn out in the initial stage.

In the initial state of the above-described pair of conveyor rollers (14A and 14B), it is possible for the operator to easily insert even a bill having wrinkles into the paper sheet insertion slot 5. Then, when an insertion of the bill is detected by the insertion detecting sensor 7 (ST01), a black calibration process is conducted (ST02) as a detection signal from the light receiving part 81*a* is acquired in a condition that the emission of the light emitting parts 80*a*, 81*b* is made to be ineffective. Here, as to the timing to implement the black calibration process, it may be implemented before the bill reading process is conducted by a line sensor as described later.

The driving motor 20 of the presser plate 115 as described above is driven to rotate reversely by a predetermine amount (ST03) to move the presser plate 115 to the initial position. That is, the presser plate 115 is in a state that the presser plate 115 is moved and remains in the opening formed between the pair of regulatory members 110 such that it is so arranged that the bill cannot pass through the opening until the insertion of another bill is detected by the insertion detecting sensor 7.

When the presser plate 115 is moved from the standby position to the initial position, the press standby part 108 becomes in an open state (refer to FIG. 4) such that the apparatus is in a state that the bill can be conveyed into the bill housing part 100. That is, by driving the motor 20 to rotate reversely for a predetermined amount, the presser plate 115 is moved from the standby position to the initial position via the main body side gear train 21 and the presser plate driving mechanism 120 (the housing part side gear train 124, the rack formed on the movable member 122, and the link members 115*a*, 115*b*).

Further, the above-described roller up-and-down motor 70 is driven to move the upper conveyor roller 14A so as to make a contact with the lower conveyor roller 14B. In accordance therewith, the inserted bill is nipped and held therebetween by the pair of conveyor rollers (14A and 14B) (ST04).

Next, a traveling route opening process is conducted (ST05). The opening process is conducted by driving the pair of movable pieces 10A to move in separating directions so as to become apart with each other as the motor 40 for the skew correction mechanism is driven to rotate reversely as shown in the flow chart of FIG. 10 (ST100). At this time, when it is detected that the pair of movable pieces 10A have moved to the predetermined positions (the maximum open width positions) by the movable piece detecting sensor (ST101), the driving operation to rotate the motor 40 reversely is stopped (ST102). This traveling route opening process makes the skew correction mechanism in such a condition as to allow the paper sheet to enter between the pair of movable pieces 10A. Here, in the previous step of ST05, the bill traveling route 3 is in a closed state by a traveling route closing process (ST17, ST59) to be described later. Thus, the bill traveling route 3 is closed in this way before an insertion of the bill so as to prevent an element such as a line sensor from being broken by, for example, inserting a plate-like member from the bill insertion slot for illicit purposes or the like.

Next, the bill conveyor motor 13 is driven to rotate normally (ST06). The bill is conveyed into the inside of the apparatus by the conveyor roller pair (14A and 14B), and when the movable piece passage detecting sensor 12 installed on the downstream side from the skew correction mechanism 10 detects the leading end of the bill, the bill conveyor motor 13 is stopped (ST07 and ST08). At this time, the bill is located between the pair of movable pieces 10A constituting the skew correction mechanism 10.

Subsequently, the above-described roller up-and-down motor 70 is driven to allow the conveyor roller pair (14A and 14B) holding the bill therebetween to become apart from each other (ST09). At this time, the bill is in a state that no load is applied.

Figure 11:
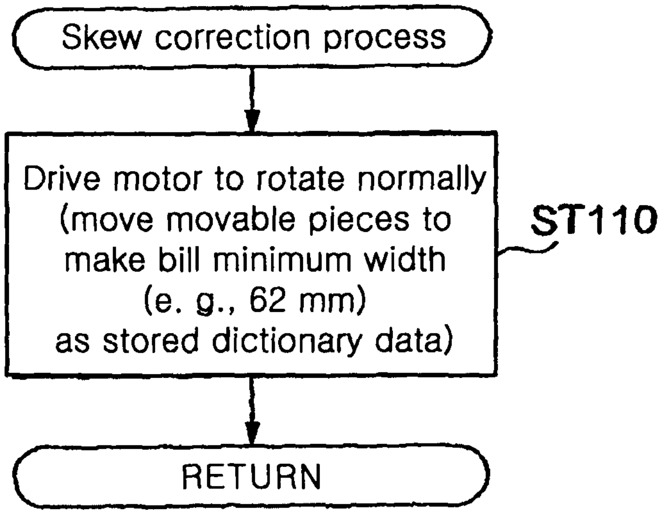
FIG. 11 shows a flowchart illustrating processing operations of a skew correction operating process.

Then, a skew correction operating process is executed as the bill remains in this state (ST10). The skew correction operating process is conducted by driving the motor 40 for the skew correction mechanism to rotate normally to drive the pair of movable pieces 10A to get closer with each other. That is, in this skew correction operating process, as shown in the flowchart of FIG. 11, the motor 40 described above is driven to rotate normally to move the pair of movable pieces 10A in respective directions such that the pair of movable pieces 10A get closer with each other (ST110). The movement of the movable pieces is continued until the distance therebetween becomes the minimum width (for example; width of 62 mm) of the bill registered in the reference data storage part in the control means. And the skew is corrected by the movable pieces 10A touching both sides of the bill such that the bill may be positioned at the accurate center position.

When the skew correction operating process as described above is completed, a traveling route opening process is subsequently executed (ST11). This process is conducted by moving the pair of movable pieces 10A in separating directions as the above-described motor 40 for the skew correction mechanism is driven to rotate reversely (refer to ST100 to ST102 of FIG. 10).

Next, the above-described roller up-and-down motor 70 is driven to move the upper conveyor roller 14A to contact the lower conveyor roller 14B, and the bill is nipped and held between the pair of conveyor rollers (14A and 14B) (ST12). Thereafter, the bill conveyor motor 13 is driven to rotate normally to convey the bill into the inside of the apparatus, and when the bill passes through the bill reading means 8, a reading process of the bill is executed (ST13 and ST14).

Figure 13:
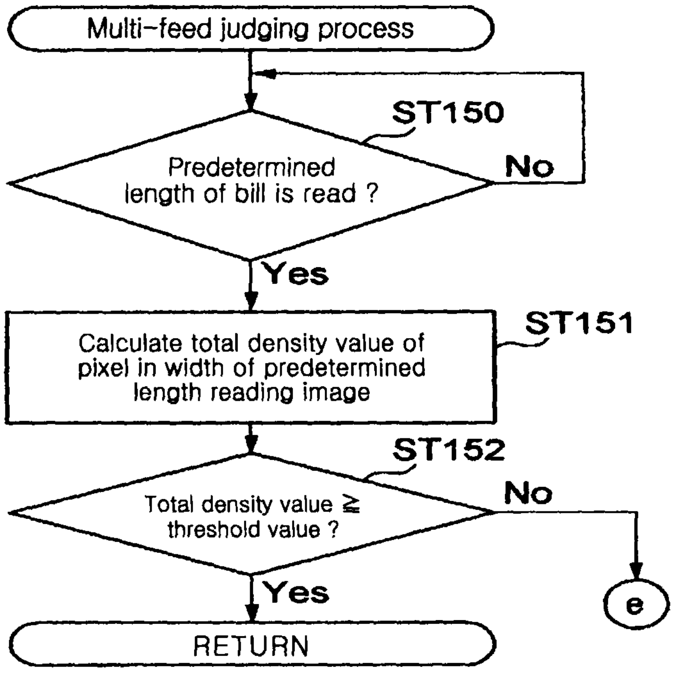
FIG. 13 shows a flowchart illustrating a multi-feed judgment process.

Along with the beginning of the bill reading process, a multi-feed judgment process of the bill is executed by the multi-feed judging part 236 (ST14). The multi-feed judgment process, as shown in the flow chart of FIG. 13, is to judge whether the bill is first read for a predetermined distance (ST150), and when the reading process for the predetermined distance is completed, the total density value of the pixel by the transmissive light is calculated (ST151). Here, the calculated density value is corrected with respect to the brightness based on the reference value set in the above-mentioned black calibration process (ST02).

Then, the authenticity judgment processing part 230 of the control means 200 compares the total density value of the pixel data acquired in the leading end area of the bill with the density value of the reference data in the same area stored in the reference data storage part 234, and conducts a determining process whether the bill is conveyed in a double feed condition (whether the leading end portion is folded or not) based on a predetermined threshold (ST152).

When an output value from the light receiving part 81*a* is lowered because of some factors such as an environmental temperature change or the like during implementation of the determining process, it is typically possible to judge erroneously that the bill is conveyed in a double feed condition because the brightness of the image is lowered although the bill is inserted in an appropriate condition. However, it is possible to implement an accurate multi-feed judgment since the output value from the light receiving part 81*a* is corrected to an appropriate level through the above-mentioned black calibration process.

When it is determined that the bill is conveyed in a multi-feed condition in this ST152 processing, the CPU 220 drives the bill conveyor motor 13 to rotate reversely so as to discharge the bill immediately from the bill insertion slot 5 (ST152: No, ST53 to ST55). That is, when it is determined that the bill is conveyed in the multi-feed condition in the process of ST152 before the completion of the bill reading process, the bill is immediately conveyed back without carrying out the subsequent bill reading process so as to be discharged from the bill insertion slot 5, and the series of processes for the bill is completed (ST53 to ST60).

Then, in the case where it is determined that the bill is not conveyed in the multi-feed condition in the above-mentioned determining process (ST152), the bill reading process is continued as it is conveyed (ST16).

Figure 12:
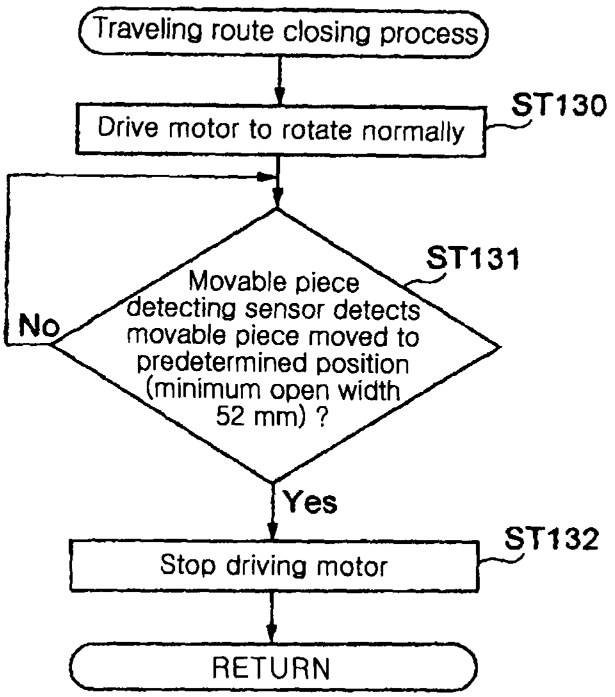
FIG. 12 shows a flowchart illustrating processing operations of a traveling route closing process.

Then, when the bill being conveyed passes through the bill reading means 8, and the trailing end of the bill is detected by the movable piece passage detecting sensor 12 (ST16), a process for closing the bill traveling route 3 is executed (ST17). In this process, first, as shown in the flowchart of FIG. 12, after the trailing end of the bill is detected by the movable piece detecting sensor 12, the above-described motor 40 is driven to normally rotate to move the pair of movable pieces 10A in the directions that they get closer to each other (ST130). Next, when it is detected by the movable piece detecting sensor that the movable pieces 10A move to the predetermined positions (minimum open width positions: for example, width of 52 mm) (ST131), the driving operation of the normal rotation of the motor 40 is stopped (ST132).

With this traveling route closing process, the pair of movable pieces 10A are moved to the positions of the minimum open width (width of 52 mm) narrower than the width of any bill allowed to be inserted, thereby effectively preventing the bill from being drawn out. That is, by executing such a bill traveling route closing process, an opening distance between the movable pieces 10A is made shorter than the width of the inserted bill, thereby enabling the effective prevention of an action of drawing-out the bill in the direction toward the insertion slot by the operator for illicit purposes.

In succession to the traveling route closing process described above (ST17), a conveyor roller pair spacing process in which the driving source 70 is driven to allow the conveyor roller pair (14A and 14B) coming to hold the paper sheet therebetween to be spaced from one another is executed (ST18). By executing the conveyor roller pair spacing process, even if the operator additionally inserts (double insertion) another bill by mistake, the bill is not subject to a feeding operation by the conveyor roller pair (14A and 14B) and hits front ends of the pair of movable pieces 10A in a closed state according to ST17 such that it is possible to reliably prevent the operation of bill double-insertion.

Along with the bill traveling route closing process as mentioned above, when the bill reading means 8 reads the data up to the trailing end of the bill, the bill conveyor motor 13 is driven for a predetermined amount and stops the bill in a predetermined position (an escrow position; a position where the bill is conveyed toward the downstream by 13 mm from the center position of the bill reading means 8), and at this time, an authenticity judgment process of the bill is executed in the comparison judgment part 234 by referring to the reference data stored in the reference data storage part 233 in the authenticity judgment processing part 230 of the above-mentioned control means 200 (ST19 to ST22).

In the bill authenticity judgment process at ST21 as described above, when the bill is judged as a legitimate bill (ST23; Yes), the motor 13 for the bill conveyance is rotated normally (ST24). While the bill is conveyed, the bill conveyor motor 13 is driven to rotate normally until the trailing end of the bill is detected by the discharge detecting sensor 18 (ST25), and after the trailing end of the bill is detected by the discharge detecting sensor 18, the bill conveyor motor 13 is driven to rotate normally for a predetermined amount (ST26 and ST27).

The process for driving the bill conveyor motor 13 to rotate normally in ST26 and ST27 corresponds to a driving amount for which the bill is conveyed in the receiving port 103 of the bill housing part 100 from the discharge slot 3*a* on the downstream side of the bill traveling route 3 of the apparatus main body 2 so that the pair of belts 150 contact the surface on both sides of the conveyed-in bill to guide the bill stably to the press standby part 108. That is, by further driving the bill conveyor motor 13 to rotate normally for a predetermined amount after the trailing end of the bill is detected by the discharge detecting sensor 18, the pair of belts 150 contact the bill conveyed-in and are driven in the bill feeding direction so as to guide the bill in a stable state to the press standby part 108.

Then, after the above-described bill conveyor motor 13 is stopped, the process for driving the presser plate 115 is executed (ST28) such that the bill is placed on the placing plate 105. And, after the pressing process is completed, the presser plate 115 is again moved to the standby position and stopped to the position.

Figure 10:
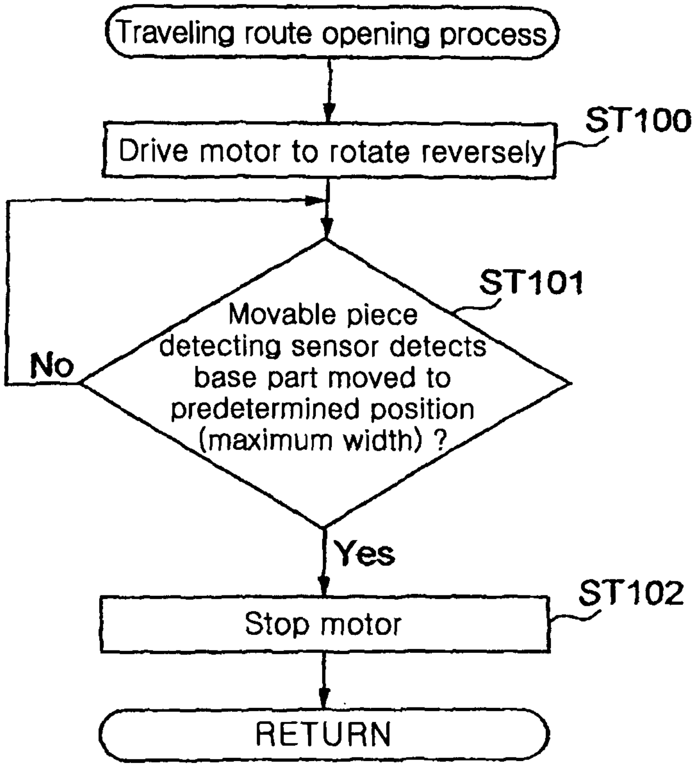
FIG. 10 shows a flowchart illustrating processing operations of a traveling route opening process.

Further, in the above-mentioned process of ST23, when the bill is judged as a non-legitimate bill, a traveling route opening process is executed (ST51, refer to ST100 to ST102 of FIG. 10). After that, the bill conveyor motor 13 is driven to rotate reversely and the conveyor roller pair (14A, 14B) are brought into a contact with each other such that the bill waiting at the escrow position is conveyed toward the bill insertion slot 5 (ST52 and ST53).

Further, with the configuration of this embodiment, even when it is judged that the read bill is not the legitimate bill, the bill is not immediately discharged out of the apparatus, but a reading process is repeated for a predetermined number of times (three times) as shown in the following steps.

That is, when the bill is conveyed toward the bill insertion slot 5 in ST53 as described above, and the insertion detecting sensor 7 detects the trailing end of the bill to be returned toward the bill insertion slot 5, the driving to reversely rotate the bill conveyor motor 13 is stopped (ST54, ST55). At this time, when it is not determined that the bill is conveyed in a multi-feed condition in the above-mentioned bill multi-feed judging process (ST56, No), it is judged whether or not the bill authenticity judgment process has been carried out for three times (ST57), and when the bill authenticity judgment process has not been carried out for three times (ST57, No), the above-mentioned processes in the step of ST06 and subsequent steps thereof are performed (This re-try process is repeated twice). Further, when the bill authenticity judgment process has been carried out for three times (ST57, Yes), the bill authenticity judgment process is no longer carried out, and a discharge process thereof is performed.

This discharge process is executed by driving the roller up-and-down motor 70 to allow the conveyor roller pair (14A and 14B) holding the bill therebetween in the ST52 to become apart from each other (ST58). And, after that, the traveling route closing process is executed (refer to ST59, and ST130 to ST132 in FIG. 12) and the driving motor 20 for the presser plate 115 is driven to rotate normally for a predetermined amount (ST60) such that the presser plate 115 positioned in the initial position is driven to move to the standby position, and then a series of processes is completed.

In addition, as described above, a discharge process for the bill having been determined to be conveyed in the multi-feed condition is executed such that the bill is discharged immediately from the bill insertion slot 5 (ST53 to ST55) by reversely rotating the bill conveyor motor 13 during reading motion, and then the discharge process is performed without carrying out the bill reading processes for three times in total in ST57 (ST56; Yes), and then the series of processes are to be completed (ST58 to ST60).

Figure 14:
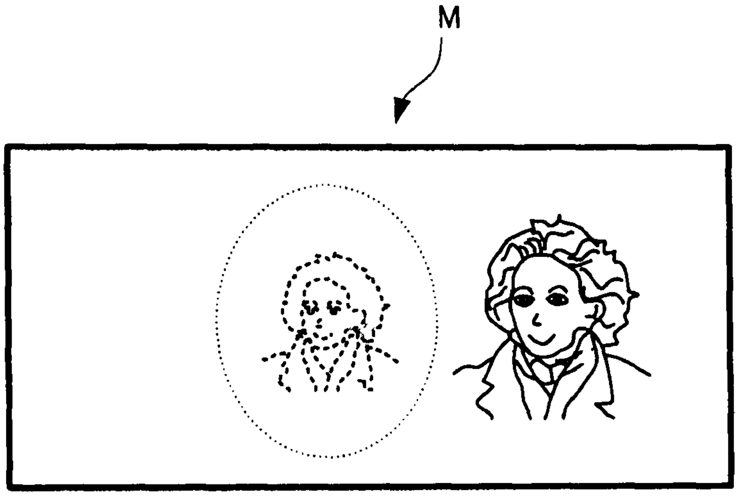
FIG. 14 shows an image diagram of an image based on image data of a bill when a black calibration is appropriately made.
Figure 15:
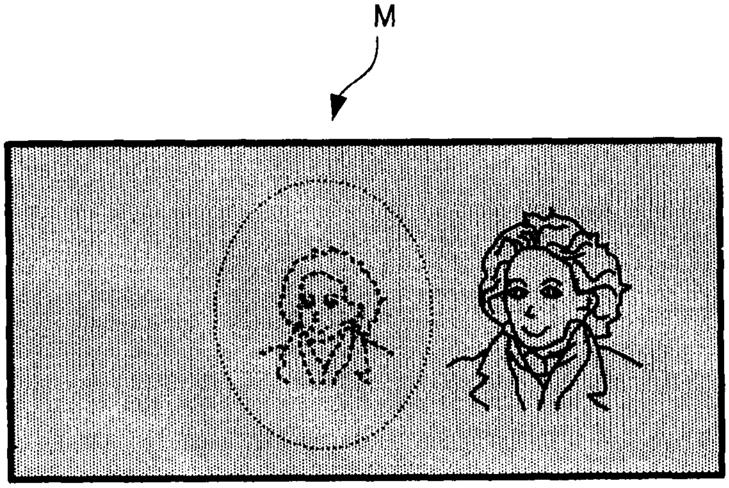
FIG. 15 shows an image diagram of an image based on image data of a bill when a black calibration is made inappropriately.

FIGS. 14 and 15 are image diagrams illustrating an image M of a bill to be read with the bill reading processing apparatus 1 of the embodiment as described above. In practice, the range that the bill processing apparatus 1 reads is limited to a portion necessary for an authenticity identification of the bill or other objectives. Here, however, the image M to be obtained is schematically shown if the even whole bill is read.

FIG. 14 shows the image M (schematic view) of the bill based on image data in the case where the black calibration is appropriately implemented in the embodiment as described above. On the other hand, FIG. 15 shows the image M (schematic view) of the bill based on image data in the case where the black calibration is not appropriately implemented. As being apparent from these figures, when the black calibration is insufficient, the contrast of the image data deteriorates. That is, in the case where a temperature is increased because the frequency of use is increased from when an environmental temperature of the bill processing apparatus 1 is low, or in the case where an environment facility such as an air conditioner or the like is not sufficiently effective such that the temperature is increased, the black calibration only in the initial stage is not sufficient such that the contrast may be lowered as shown in FIG. 15.

Figure 16:
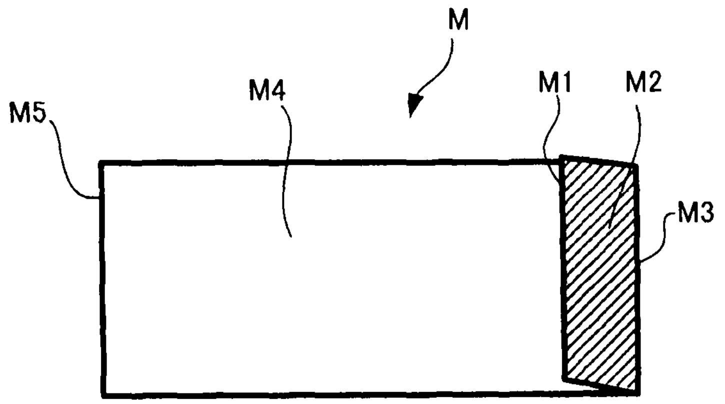
FIG. 16 is a schematic diagram showing a bill in a state that a leading end of the bill is folded.
Figure 17:
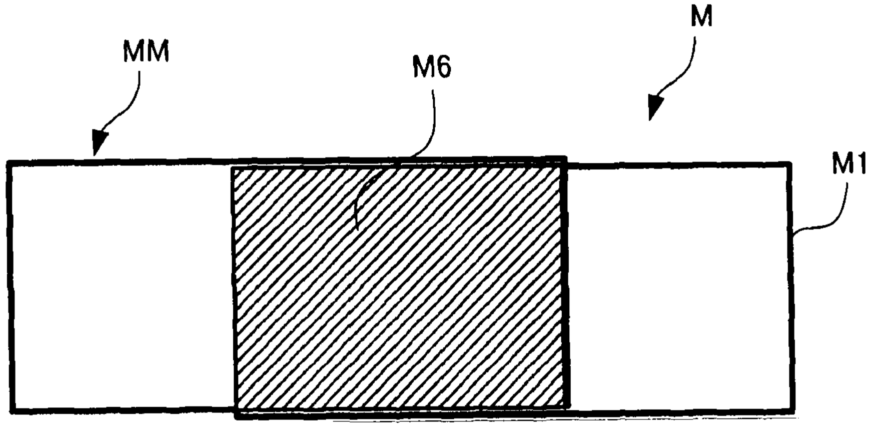
FIG. 17 is a schematic diagram showing two bills in a state that the two bills are overlapped.

FIG. 16 shows schematically a case where the leading end of the bill M is bent to cause an overlapped portion. The leading end M1 of the bill M is bent along a bent line M3 so that an overlapped portion M2 is caused, and a main body M4 and a trailing end M5 follow sequentially. Therefore, intensity of the transmitted light through the overlapped portion M2 is lowered to be approximately one half as compared to a normal or non-overlapped bill. Accordingly, density values in this portion become large (dark) as compared to an ordinary portion. Thus, through the multi-feed determination process, it can be determined that bill conveyance in a double feed condition is caused. In this way, an abnormal state of the bill can be detected in an early stage by such an overlapped portion caused in the leading end portion such that a prompt processing can be performed. Since such a bent paper sheet may lead to an erroneous authenticity judgment as well as a paper jam, it is preferable to eject the bent paper sheet in an early stage. Moreover, FIG. 17 shows schematically a case where two bills M and MM overlap with each other. The bill M overlaps with the bill MM in an area M6 and the intensity of the transmitted light therethrough is reduced to about one half. Accordingly, density values in this portion become large (dark) as compared to a normal portion. Thus, it can be determined through the multi-feed determining process that the conveyance in the double feed is caused. It is preferable to implement the multi-feed multi-feed judging process ST15 of FIG. 8 while the bill M is being conveyed in order to improve the processing rate. It is possible to implement the judgment during conveyance of the bill since the judgment criterion is rather simple as compared to the case of the authenticity judgment.

Figure 18:
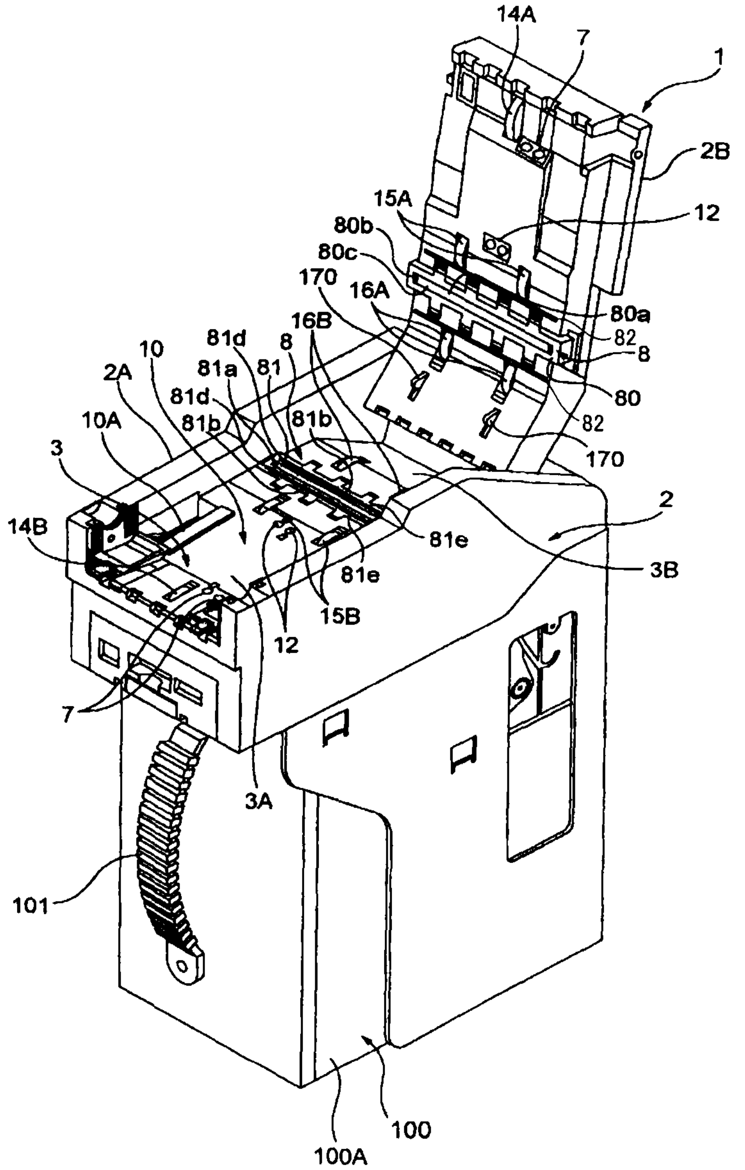
FIG. 18 is a perspective view showing a bill processing apparatus in a state that an open/close member is opened for a main body frame of an apparatus main body according to another embodiment.
Figure 19:
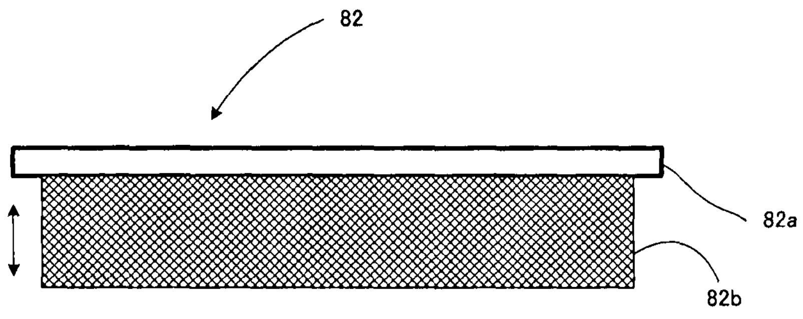
FIG. 19 is a diagram illustrating performance of a blackout curtain member.

FIG. 18 is a perspective view showing a state that an open/close member is opened for a main body frame of an apparatus main body. The apparatus main body 2 is basically identical to that shown in FIG. 2. This embodiment differs from the latter in that blackout curtain members 82 are disposed in front of and in back of the bill reading means along the traveling direction, the bill reading means including a light emitting unit 80 having a first light emitting part 80*a* and a light receiving/emitting unit 81 disposed on the main frame 2A side. As shown in FIG. 19, this blackout curtain member 82 includes a blackout curtain member main body 82*a* and a blackout curtain 82*b*. The blackout curtain members 82 are disposed at front and back positions in the traveling direction, and the blackout curtain 82*b* serves to shield the light leaking from a gap in the traveling direction in the black calibration processing ST02. When the black calibration processing ST02 is completed, the blackout curtain 82*b* is wound into the blackout curtain member main body 82*a*, and is controlled so as not to prevent the conveyance operation of the bill. The blackout curtain member main body 82*a* comprises a blackout curtain winding drive device capable of receiving a control signal from CPU 220.

In accordance with the paper sheet processing apparatus with the concrete configuration as described above, since the black calibration is implemented at every time before a bill is inserted so that an authenticity judgment processing is carried out, even if the environmental change such as a temperature change and the like during the operation of the apparatus is caused such that the properties of the light receiving sensor are changed, it is possible to perform an accurate authenticity judgment processing.

Moreover, the apparatus may includes a multi-feed judging part which judges whether the paper sheet having been inserted into the insertion slot is in an overlapped condition or not based on a comparison result of brightness of the converted plural pixel data and a predestined brightness after setting of the reference value is executed.

In accordance with the paper sheet processing apparatus with the concrete configuration as described above, judgment whether or not a paper sheet or paper sheets are conveyed in a multi-feed condition (including a state where a plurality of paper sheets are inserted and overlapped, and a state where the bill is bent to cause an overlapped portion) can be implemented by the multi-feed judging part. In this case, even if the environmental change is caused so that the brightness of the light received data of the paper sheet having been read is changed, since the above-mentioned black calibration is implemented therebefore, it is possible to lower the probability that the paper sheet in an appropriate insertion condition may be erroneously judged as being in the multi-feed condition.

Moreover, the paper sheet processing apparatus comprises: an insertion slot into which a paper sheet is inserted; a sensor which detects insertion of the paper sheet with respect to the insertion slot; a traveling route along which the paper sheet inserted into the insertion slot is conveyed; a light emitting part which irradiates the traveling route with light; a light receiving part which receives light from the traveling route; a conveyance mechanism which conveys the paper sheet along the traveling route so that transmitted light and/or reflected light from the paper sheet which the light emitting part irradiates with light is received by the light receiving part; a storage part in which data can be stored; and a processor for controlling the above-mentioned components, wherein the processor is operative to receive, from the sensor, a detection signal indicating that it is detected that the paper sheet has been inserted into the insertion slot; to make the light emitting part to be ineffective; to allow the light receiving part having received light from the traveling route to transmit a light received signal therefrom in a state where the light emitting part is made to be ineffective; to set a reference value for the lowest brightness based on the light received signal; to allow the storage section to store the reference value thus set; to allow the conveyance mechanism to convey the paper sheet along the traveling route; to allow the light emitting part to irradiate the traveling paper sheet with light; to convert light received by the light receiving part into a plurality of pixel data of a predetermined size as a unit including color information having brightness; to store the pixel data thus obtained into the storage part; to compare, based on a reference value having been set by the black calibration part, the plurality of pixel data thus stored with reference pixel data of a legitimate paper sheet; to allow the storage part to record a comparison result thus obtained, thereby making it possible to judge the authenticity of the paper sheet.

Here, the above-described conveyance mechanism may include, e.g., conveyor rollers or conveyor roller pairs (14A, 14B), (15A, 15B), (16A, 16B) and (17A, 17B). Moreover, such a conveyance mechanism may include a motor 13 serving as a driving source and the like and/or pulley or belt and the like as drive force transmission means for allowing such components to interlock with each other. In addition, the above-described storage part may include a reference data storage part 234, or a so-called memory except therefor. Then, the above-described processor may include the CPU 220. Further, the processor may include other processors. Further, making the light emitting part to be ineffective may include controlling and turning off the above-described light emitting part (e.g., first light emitting part 80*a* and second light emitting part 81*b*), preventing the emitted light from reaching the above-mentioned light receiving part, or the like. In addition, e.g., the detection signal from the light receiving part 81*a* may be converted into pixel information so as to set such pixel information as reference brightness (reference value) and store the same. In accordance with the configuration as described above, the black calibration can be made at every time when the paper sheet is inserted. Thus, it is possible to obtain more accurate measured values with each correction for each time.

Moreover, in the above-described paper sheet processing apparatus, the processor can judge whether the bill having been inserted into the insertion slot is in an overlapped condition or not based on a comparison result of the predetermined brightness and the brightness of the plurality of pixel data having stored after setting of the reference value is executed.

Moreover, in the paper sheet processing method utilizing the paper sheet apparatus as described above, the method comprises: receiving, from the sensor, a detection signal indicating that the paper sheet has been inserted into the insertion slot; making the light emitting part to be ineffective based on the detection signal thus received; allowing the light receiving part having been received light from the traveling route to transmit a light receive signal therefrom in the state where the light emitting part is made to be ineffective; setting a reference value of the lowest brightness based on the light received signal; allowing the storage part to record the reference value thus set; allowing the light emitting part to irradiate the traveling paper sheet with light while the paper sheet is conveyed along the traveling route by the conveyance mechanism; converting light received by the light receiving part into a plurality of pixel data of a predetermined size as a unit including color information having brightness; and storing such pixel data thus obtained in the storage part. Further, the stored plural pixel data and reference pixel data of the legitimate paper sheet may be compared with each other based on the reference value having been set by the black calibration part.

Moreover, the conveyance mechanism may be controlled to discharge the paper sheet when the processor judges that the paper sheet is in an overlapped condition by determining whether the paper sheet having been inserted into the insertion slot is in as state that the paper sheet is in an overlapped condition or not based on a comparison result between the predetermined brightness and the brightness of the plurality of pixel data having been stored after setting of the reference value is executed.

In accordance with the paper sheet processing apparatus with the concrete configuration as described above, since the black calibration is executed with respect to the brightness of the light detected by light receiving part 81*a* which receives detection light from the bill at every time before the bill is inserted so that the authenticity judgment processing is performed, even if an environmental change such as a temperature change or the like, for example, happens during the operation of the apparatus such that the property of the light receiving part 81*a* is changed, it is possible to perform an accurate authenticity judgment processing.

In addition, a multi-feed judging part is provided in this embodiment, and the multi-feed judging part determines whether bills are conveyed in a double feed condition or not and whether the leading end portion is folded or not by comparing a density value for each pixel in the leading end portion of the bill having been read out by the line sensor with a density value for each reference pixel corresponding to the thus-read portion, in consideration that the line sensor can read out the entire width of the bill and the two-dimensional image can be acquired as the bill is conveyed.

By providing such a multi-feed judging part, even if the environmental change and the like occurs as described above such that the brightness of the light received data of the bill having been read is lowered, it is possible to lower the probability to judge erroneously the bill in an appropriate insertion condition as in a double feed condition since the above-mentioned black calibration is performed at every time when the bill is inserted.

As described above, the paper sheet processing apparatus may be provided with which the authenticity judgment process of the paper sheet may be performed accurately even if the environmental change occurs.

As mentioned above, the embodiment of the present invention is described. However, the present invention is not limited to the above-described embodiments, and various modifications of the present invention can be implemented.

The present invention is characterized in that the black calibration processing of the light receiving part constituting the bill reading means is performed at every time when the bill is inserted and the reading process is executed, and the other configuration is not limited to the above-described embodiments, but various modifications may be made to. For example, a configuration, arrangement, and the like of the bill reading mean 8 may be modified as appropriate. Further, the timing at which the black calibration is performed may also be changed as an occasion demands.

The present invention can be applied not only to the bill processing apparatus, but also to a device which provides various kinds of products and services when the paper sheet such as a service ticket and a coupon ticket, for example, is inserted. In particular, in accordance with the configuration of the present invention, in the paper sheet processing apparatus in which the authenticity judgment processing of a service ticket on which a bar code is printed or the like is executed, it is possible to prevent the judgment accuracy of the authenticity from lowering.

What is claimed is:

1. A paper sheet processing apparatus comprising:

an insertion slot into which a paper sheet is inserted;

a sensor which detects insertion of the paper sheet from the insertion slot;

a traveling route in which the paper sheet inserted from the insertion slot is conveyed;

a first light emitting part which is disposed on an upper side of the traveling route and irradiates an upper side of the paper sheet to be conveyed with light;

a second light emitting part which is disposed on a lower side of the traveling route and irradiates a lower side of the paper sheet to be conveyed with light;

a light receiving part which receives light that is transmitted through the paper sheet by the first light emitting part and light that is reflected from the paper sheet by the second light emitting part;

a black calibration part which sets a reference value for lowest brightness of light with respect to light received by the light receiving part in a state where emission by the light emitting part is made ineffective;

an authenticity judgment processing part which judges an authenticity of the paper sheet by comparing a plurality of pixel data obtained by converting the lights received by the light receiving part into data per unit pixel having a predetermined size and including color information having brightness as the first and second light emitting parts irradiate the paper sheet traveling in the traveling route with the lights with reference pixel data with respect to a legitimate paper sheet based on the reference value set by the black calibration part; and a multi-feed judging part which judges whether the paper sheet having been inserted into the insertion slot is in an overlapped condition based on a comparison result between predetermined brightness and brightness of the converted plurality of pixel data after setting of the reference value is executed, wherein the black calibration part can set the reference value before the authenticity judgment processing part judges the authenticity after the sensor detects the insertion of the paper sheet every time when the paper sheet is inserted, and wherein after the paper sheet is read for a predetermined distance, the multi-feed judging part calculates a total density value of the converted plurality of pixel data in an leading end area of the read paper sheet and compares the total density value with a density value of the reference pixel data in a same area as the leading end area, to determine whether the paper sheet having been inserted into the insertion slot is in the overlapped condition based on a predetermined threshold.

2. The paper sheet processing apparatus according to claim 1, wherein the first light emitting part includes a plurality of light sources for irradiating lights having different wavelengths.

3. The paper sheet processing apparatus according to claim 1, wherein the second light emitting part includes a plurality of light sources for irradiating lights having different wavelengths.

4. A paper sheet processing apparatus comprising:

an insertion slot into which a paper sheet is inserted;

a sensor which detects insertion of the paper sheet from the insertion slot;

a traveling route in which the paper sheet inserted from the insertion slot is conveyed;

a first light emitting part which is disposed on an upper side of the traveling route and irradiates an upper side of the paper sheet to be conveyed with light;

a second light emitting part which is disposed on a lower side of the traveling route and irradiates a lower side of the paper sheet to be conveyed with light;

a light receiving part which receives light that is transmitted through the paper sheet by the first light emitting part and light that is reflected from the paper sheet by the second light emitting part;

a conveyance mechanism which conveys the paper sheet along the traveling route such that the light receiving part receives transmitted light and/or reflected light from the paper sheet irradiated with the light by the light emitting part;

a storage part which is capable of storing data; and a processor which controls these components;

wherein the processor is operative to:

receive a detection signal from the sensor to detect that the paper sheet is inserted into the insertion slot;

allow the light emitting part to be ineffective;

allow the light receiving part having received light from the traveling route in a state that the light emitting part is ineffective to transmit a light received signal;

allow a reference value for lowest brightness based on the light received signal to be set and stored in the storage part;

allow the conveyance mechanism to convey the paper sheet along the traveling route;

allow the paper sheet traveling to the first and second light emitting parts to be irradiated with lights, the lights received by the light receiving part including color information having brightness;

allow the lights received by the light receiving part to be converted into a plurality of pixel data for respective pixels, each of which has a predetermined size as a unit;

allow the plurality of pixel data to be stored in the storage part;

allow the stored plurality of pixel data and reference data of a legitimate paper sheet to be compared based on the reference value set by the black calibration part;

allow a comparison result to be stored in the storage part;

judge an authenticity of the paper sheet based on the comparison result; and judge whether the paper sheet having been inserted into the insertion slot is in an overlapped condition based on a comparison result of predetermined brightness and brightness of the stored plurality of pixel data after the reference value is set, wherein after the paper sheet is read for a predetermined distance, the processor is operative to calculate a total density value of the stored plurality of pixel data in an leading end area of the read paper sheet and compare the total density value with a density value of the reference pixel data in a same area as the leading end area, to determine whether the paper sheet having been inserted into the insertion slot is in the overlapped condition based on a predetermined threshold.

5. The paper sheet processing apparatus according to claim 4, wherein the first light emitting part includes a plurality of light sources for irradiating lights having different wavelengths.

6. The paper sheet processing apparatus according to claim 4, wherein the second light emitting part includes a plurality of light sources for irradiating lights having different wavelengths.

7. A method of processing a paper sheet with a paper sheet processing apparatus comprising; an insertion slot into which a paper sheet is inserted; a sensor which detects insertion of the paper sheet from the insertion slot; a traveling route in which the paper sheet inserted from the insertion slot is conveyed; a first light emitting part which is disposed on an upper side of the traveling route and irradiates an upper side of the paper sheet to be conveyed with light; a second light emitting part which is disposed on a lower side of the traveling route and irradiates a lower side of the paper sheet to be conveyed with light; a light receiving part which receives light that is transmitted through the paper sheet by the first light emitting part and light that is reflected from the paper sheet by the second light emitting part; a conveyance mechanism which conveys the paper sheet along the traveling route such that the light receiving part receives transmitted light and/or reflected light from the paper sheet irradiated with the light by the light emitting part; a storage part which is capable of storing data; and a processor which controls these components, the method comprising the steps of:

the processor receiving, from the sensor, a detection signal having been detected that the paper sheet has been inserted;

the processor allowing the light emitting part to be ineffective;

the processor allowing the light receiving part having received light from the traveling route in a state that the light emitting part is ineffective to transmit a light received signal;

the processor allowing a reference value for lowest brightness to be set based on the light received signal and to be stored in the storage part;

the processor allowing the conveyance mechanism to convey the paper sheet along the traveling route;

the processor allowing the first and second light emitting parts to irradiate the traveling paper sheet with lights;

the processor allowing the lights received by the light receiving part to be converted into a plurality of pixel data for a pixel of a predetermined size as a unit;

the processor allowing the plurality of pixel data to be stored in the storage part;

the processor allowing the stored plurality of pixel data and reference pixel data of a legitimate paper sheet to be compared based on the reference value having set by the black calibration part;

the processor judging an authenticity of the paper sheet based on a comparison result; and the processor judging whether the paper sheet having been inserted into the insertion slot is in an overlapped condition or not based on a comparison result of the predetermined brightness and the brightness of the stored plurality of pixel data after setting of the reference value is executed, wherein after the paper sheet is read for a predetermined distance, the processor calculates a total density value of the stored plurality of pixel data in an leading end area of the read paper sheet and compares the total density value with a density value of the reference pixel data in a same area as the leading end area, to determine whether the paper sheet having been inserted into the insertion slot is in the overlapped condition based on a predetermined threshold.

8. The method of processing the paper sheet according to claim 7, wherein the processor:

controls the conveyance mechanism to discharge the paper sheet once it is determined that the paper sheet is in the overlapped condition.

9. The paper sheet processing apparatus according to claim 7, wherein the first light emitting part includes a plurality of light sources for irradiating lights having different wavelengths.

10. The paper sheet processing apparatus according to claim 7, wherein the second light emitting part includes a plurality of light sources for irradiating lights having different wavelengths.

* * * * *